United States Patent
Boschker et al.

(10) Patent No.: US 11,573,096 B2
(45) Date of Patent: Feb. 7, 2023

(54) NAVIGATION OR MAPPING APPARATUS AND METHOD

(71) Applicant: TomTom Navigation B.V., Amsterdam (NL)

(72) Inventors: Breght Roderick Boschker, Hilversum (NL); Rob van Seggelen, Budel (NL)

(73) Assignee: TOMTOM NAVIGATION B.V., Amsterdam (NL)

( * ) Notice: Subject to any disclaimer, the term of this patent is extended or adjusted under 35 U.S.C. 154(b) by 0 days.

(21) Appl. No.: 15/584,047

(22) Filed: May 2, 2017

(65) Prior Publication Data

US 2017/0268898 A1  Sep. 21, 2017

Related U.S. Application Data

(63) Continuation of application No. 13/640,107, filed as application No. PCT/EP2010/064144 on Sep. 24, 2010, now Pat. No. 9,671,246.

(Continued)

(51) Int. Cl.
*G01C 21/36* (2006.01)
*G01C 21/34* (2006.01)
(Continued)

(52) U.S. Cl.
CPC ......... *G01C 21/3664* (2013.01); *G01C 21/34* (2013.01); *G01C 21/3484* (2013.01); *G01C 21/3626* (2013.01); *G06F 3/0484* (2013.01); *G06F 8/70* (2013.01); *G06F 9/541* (2013.01); *G06T 11/60* (2013.01)

(58) Field of Classification Search
None
See application file for complete search history.

(56) References Cited

U.S. PATENT DOCUMENTS

| 7,970,541 B2 * | 6/2011 | Ando | G01C 21/3664 345/581 |
| 8,914,224 B2 * | 12/2014 | Geelen | G01C 21/367 701/117 |

(Continued)

FOREIGN PATENT DOCUMENTS

JP   02004028703 A  *  1/2004

OTHER PUBLICATIONS

Translation of JP02004028703A.*

*Primary Examiner* — Alan D Hutchinson
(74) *Attorney, Agent, or Firm* — Park, Vaughan, Fleming & Dowler LLP

(57) ABSTRACT

The invention relates to a navigation device comprising a display for displaying a digital map to a user, a processor configured to access digital map data and cause a digital map to be displayed to a user using the display, and a user interface operable by a user to enable the user to interact with the apparatus. The user interface is arranged to allow a user to select a continuous region present in the digital map by providing one or more indications on the digital map displayed to the user. The processor is arranged to determine digital map data relating to the selected continuous region, and to carry out one or more mapping or navigation operations using the determined digital map data. The processor may calculate a route using a path selected on the map by a user.

14 Claims, 11 Drawing Sheets

Related U.S. Application Data

(60) Provisional application No. 61/322,325, filed on Apr. 9, 2010.

(51) Int. Cl.
 *G06F 8/70* (2018.01)
 *G06F 9/54* (2006.01)
 *G06T 11/60* (2006.01)
 *G06F 3/0484* (2022.01)

(56) References Cited

U.S. PATENT DOCUMENTS

| | | | | |
|---|---|---|---|---|
| 9,495,092 B2* | 11/2016 | Kim | | G06F 3/0488 |
| 2003/0083811 A1* | 5/2003 | Demir | | G01C 21/32 |
| | | | | 701/461 |
| 2005/0034075 A1* | 2/2005 | Riegelman | | G09B 19/00 |
| | | | | 715/714 |
| 2007/0185649 A1* | 8/2007 | Geilich | | G01C 21/32 |
| | | | | 701/532 |
| 2008/0132241 A1* | 6/2008 | Hancock | | H04W 28/26 |
| | | | | 455/450 |
| 2009/0055094 A1* | 2/2009 | Suzuki | | G01C 21/3682 |
| | | | | 701/533 |
| 2009/0153492 A1* | 6/2009 | Popp | | G06F 3/04883 |
| | | | | 345/173 |
| 2009/0192703 A1* | 7/2009 | Hess | | G01C 21/3461 |
| | | | | 701/532 |
| 2009/0271722 A1* | 10/2009 | Park | | G06F 3/0488 |
| | | | | 715/765 |
| 2011/0238289 A1* | 9/2011 | Lehmann | | G01C 21/3438 |
| | | | | 701/533 |
| 2013/0013198 A1* | 1/2013 | Adrain | | G01C 21/3461 |
| | | | | 701/468 |
| 2013/0131984 A1* | 5/2013 | Elgersma | | G05D 1/024 |
| | | | | 701/514 |
| 2013/0219308 A1* | 8/2013 | Britton | | G06F 3/0488 |
| | | | | 715/764 |
| 2013/0238599 A1* | 9/2013 | Burris | | G06Q 50/01 |
| | | | | 707/722 |
| 2015/0066356 A1* | 3/2015 | Kirsch | | G01C 21/3664 |
| | | | | 701/425 |

\* cited by examiner

NAVIGATION OR MAPPING APPARATUS AND METHOD

CROSS-REFERENCES TO RELATED APPLICATIONS

This application is a continuation of a U.S. patent application Ser. No. 13/640,107, filed Jan. 24, 2013 which is the National Stage of International Application No. PCT/EP2010/064144, filed Sep. 24, 2010, and designating the United States. The application claims the benefit of U.S. Provisional Application No. 61/322,325 filed Apr. 9, 2010. The entire contents of both these applications are incorporated herein by reference.

FIELD OF THE INVENTION

This invention relates to navigation or mapping apparatus, and methods of operating navigation or mapping apparatus. Illustrative embodiments of the invention relate to portable navigation devices (so-called PNDs), in particular PNDs that include Global Positioning System (GPS) signal reception and processing functionality. The invention is also applicable to a navigation apparatus which forms part of an integrated navigation system, e.g. an in-vehicle navigation system. Other embodiments relate, more generally, to any type of processing device that is configured to execute navigation or mapping software so as to provide route planning, and preferably also navigation, functionality, and methods of operating such devices. In particular, although not exclusively, the invention is concerned with the interaction between a user and the digital map data of such devices.

BACKGROUND TO THE INVENTION

The present invention is directed to a navigation or mapping apparatus, and methods of operating such apparatus. The apparatus may be of any suitable form as discussed above, and in more detail below. One illustrative embodiment of the apparatus is a portable navigation device comprising the apparatus of the invention. Portable navigation devices (PNDs) that include GPS (Global Positioning System) signal reception and processing functionality are well known and are widely employed as in-car or other vehicle navigation systems.

In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the GO 950 LIVE model manufactured and supplied by TomTom International B.V., provide a reliable means for enabling users to navigate from one position to another.

As will be appreciated from the above discussion, operation of such navigation or mapping apparatus typically involves interaction between the apparatus and a user at various times in order to control the apparatus. For example, the user may specify a start point and/or a destination between which a route is to be planned. The user may interact with the device to modify a suggested route e.g. to avoid/go via certain locations, or to try to avoid traffic identified by apparatus with a traffic detecting function. Existing apparatus may also provide considerable scope for interaction with the user to enable the user to customise operation of the device, and provide route planning according to user preferences. For example, the user may specify that routes avoiding motorways or ferries be calculated where possible. The apparatus may enable the user to interact with the apparatus in relation to a wide range of functions, not necessarily directly relating to route planning. For example the user may be able to interact with the apparatus in order to correct errors found in a map, or to search for features such as points of interest (POI) in a vicinity. There are numerous scenarios in which interaction between the user and the apparatus is necessary or desirable.

As described above, navigation or mapping apparatus may include one or more user interfaces to enable a user to interact with the apparatus. Typically the user provides instructions via the user interface to control the operation of the device via a menu based system. The user may navigate through the menu system using commands provided using various types of user interface, such as speech based or touch based interfaces, as well as cursor based systems, button presses etc. While such systems are of great utility, the Applicant has realised that there is scope for a more intuitive approach to the interaction between the user and a mapping or navigation apparatus in relation to operations involving digital map data.

SUMMARY OF THE INVENTION

In accordance with a first aspect of the invention there is provided a navigation or mapping apparatus, the apparatus comprising a display for displaying a digital map to a user, a processor configured to access digital map data and cause a digital map to be displayed to a user using the display, and a user interface operable by a user to enable the user to interact with the apparatus; wherein the user interface is arranged to allow a user to select a continuous region present in the digital map by providing one or more indications on the displayed digital map in use; and wherein in use, when a selection of a continuous region present in the digital map is received from a user, the processor is arranged to determine digital map data relating to the continuous region selected by the user, and to carry out one or more mapping or navigation operations using the determined digital map data.

In accordance with the invention therefore, the navigation or mapping apparatus is arranged such that a user may select a continuous region present in a digital map displayed to the user via a user interface of the apparatus. The region is selected by one or more indications provided on the displayed digital map. The apparatus is arranged to receive the selection of the continuous region from a user and determine digital map data relating to the selected region. The apparatus then carries out one or more mapping or navigation operations using the determined digital map data.

In this manner, it has been found that interaction between the user and the apparatus in relation to operations involving digital map data may proceed more intuitively. In effect, the user may directly specify a selected continuous region in a map displayed to the user. By identifying the region in the displayed digital map in this manner, the need to provide multiple instructions via a menu based system may be avoided. In accordance with the invention, the apparatus is arranged such that a user may select the continuous region using one or more indications made directly on the displayed map. In other words, rather than going through a conventional menu system to indicate a region of interest using a series of text or speech based commands, the user may directly point to a region or regions on the displayed map itself in order to select a continuous region. This may provide more intuitive operation, and reduce the number of steps required for the user to indicate a selected geographic region. This is because the user directly specifies a region of the geographic area represented by the displayed digital map. The user therefore provides a selection based upon what is visually represented in the display rather than needing to translate what they can see into a verbal form to control the apparatus.

It will be appreciated that, in accordance with the invention in any of its aspects, the selected region of the digital map indicated by the user is a continuous region, and not a discrete point or points. Thus, rather than merely selecting a single point on the displayed map, the user selects an extended region on the map. The present invention also extends to a method of operating a navigation or mapping apparatus in accordance with the invention in any of its aspects and embodiments.

In accordance with a further aspect of the invention, there is provided a method of operating a navigation or mapping apparatus, the method comprising controlling the navigation or mapping apparatus to perform a method comprising the steps of; accessing digital map data and using the accessed digital map data to display a digital map, receiving from a user via a user interface of the apparatus a selection of a continuous region present in the displayed digital map, wherein the region is selected by the user providing one or more indications on the displayed digital map; determining digital map data relating to the continuous region selected by the user, and carrying out one or more mapping or navigation operations using the determined digital map data.

It will be appreciated that the invention in this further aspect may comprise any or all of the features described in respect of the apparatus of the first aspect of the invention, and vice versa. Thus, if not explicitly stated, the method of operating the apparatus may comprise the steps of controlling the apparatus to perform any of the operations described in relation to the apparatus, and the apparatus of the invention may be arranged to carry out any of the method steps herein described. In the method aspects of the invention, the navigation or mapping apparatus comprises a display for displaying a digital map to a user, a processor configured to access digital map data and cause a digital map to be displayed to a user via the display, and a user interface operable by a user to enable the user to interact with the apparatus.

In preferred embodiments of the invention in any of its aspects or embodiments, the processor is arranged to cause the selected continuous region to be illustrated on the displayed map, and the method performed comprises the step of illustrating the selected continuous region on the displayed map. The step of illustrating the selected continuous region may comprise highlighting the selected continuous region. However, it will be appreciated the region could alternatively be illustrated by erasing features of the displayed map corresponding to the selected continuous region. The illustrating step renders the indicated region visually identifiable on the displayed map. The selected continuous region on the map may be illustrated as it is indicated by a user. This may provide a real time illustration of the indicated region to the user.

In accordance with the invention, the selected region may be indicated via the user interface in any manner which involves the user providing one or more indications on the displayed digital map. Each indication on the displayed digital map is an indication of a region of the displayed digital map. In any of the embodiments of the invention, the selected continuous region may be indicated using a single indication or a plurality of indications. Preferably each indication provided by the user is an indication of a continuous region of the displayed digital map. Where multiple indications are made, the indications may be made simultaneously or sequentially. Indications may or may not overlap.

The selected region may directly correspond to the one or more regions indicated by the user on the displayed digital map. In these embodiments the one or more indications provided by the user may define a shape corresponding to the shape of an intended selected region. For example, where multiple indications are provided, the indications may together define a shape corresponding to the shape of an intended selected region. For example, a user may draw a vertical line and then a second line perpendicular thereto, and overlapping the first line to select an L shaped region.

In other embodiments, the processor may be arranged to infer an intended selected region from one or more regions indicated on the digital map by the user. For example, the processor may be arranged to infer a precise selected region from one or more regions indicated by a user approximately indicative of an intended selected region. The step of inferring a precise selected region may comprise inferring a precise boundary for the selected region from the region(s) indicated by the user. The processor may be arranged to, for example, infer a selected region including only land from a general indication of a region or regions provided by the user including both land and water.

In some embodiments the processor may be arranged to infer an intended selected region including the one or more regions indicated by the user. Thus the indicated region or regions may be a subset of an intended selected region. For example, the user may indicate a region within a given state, and the processor may then infer that the intended selected region is the whole state.

In accordance with any of the embodiments of the invention, the processor may be arranged to infer an intended selected region from one or more indications in the form of gestures provided by the user. It will be appreciated that the way in which the processor infers an intended selected region from one or more regions indicated by the user may be controlled, for example, by setting a mode of operation of the device.

The processor may be arranged to be able to infer an intended selected region from one or more indicated regions in any of the above manners depending upon the selected mode.

In some embodiments the user provides the or each indication of a region of the displayed digital map by pointing to the region. This may be achieved by touch or by controlling a cursor as described below.

In preferred embodiments the user interface is an interface by means of which a user can operate the device by touch, i.e. a touch sensitive interface, and the user provides one or more touch indications to select the continuous region. In some particularly preferred embodiments the display comprises the touch sensitive user interface, i.e. the display is a touch display. In these embodiments the user may select the continuous region using one or more indications in the form of touch gestures on the displayed digital map. For example, the user may directly indicate a selected region by touching a part or parts of the display corresponding to the region of the map to be selected. This may provide a more intuitive operation allowing the user to manually indicate the selected region. The user interface may be arranged to permit the user to select the region using a single or multi touch gesture. In some embodiments the user may indicate the selected region by drawing the selected region on to the map. In other embodiments the user may indicate the selected region by performing a multi touch gesture on the map, and the processor is arranged to infer the selected region from the multi touch gesture performed by the user. Such embodiments may be particularly, although not exclusively, applicable to navigation device type implementations of the apparatus.

It will be appreciated that other forms of user interface may be used. In some embodiments the user interface may be arranged to permit the user to select the region of the map using one or more cursor based indications. The user interface may then comprise an arrangement to permit the user to control the position of a cursor on the display. This may be achieved using any suitable user input device e.g. a mouse, touch pad, control stick or pad, a rotary control, key stroke etc. Although not limited thereto, such embodiments may be useful in the context of implementations which do not use a specific portable navigation device, for example implementations using mapping software run on a general computer system.

In some embodiments, regardless of the form of the user interface, the apparatus is arranged to enable the user to draw a shape on the displayed map defining the selected continuous region.

The processor of the apparatus is arranged to access the digital map data. In some preferred embodiments the apparatus comprises a memory storing digital map data, and the processor is arranged to retrieve the digital map data from the store. However, it will be appreciated that the processor may retrieve the digital map data directly or indirectly in any suitable manner. The digital map data may not be stored locally. For example the digital map data may be downloaded from a remote source.

The step of determining digital map data relating to the selected region may comprise determining the digital map data for one or more locations comprised in the region of the map selected by the user. The determined digital map data may include digital map data for locations encompassed by all or a part of the selected region. The digital map data may be determined in any manner, as described in relation to accessing the digital map data for display. In embodiments the apparatus comprises a memory storing digital map data, and the step of determining the digital map data comprises retrieving the digital map data from the memory.

It will be appreciated that in accordance with the invention, the processor is arranged to determine digital map data relating to the selected region of the map indicated by the user, and to carry out a navigation or mapping operation using the data. Thus in contrast to merely, for example, providing a display related function e.g. a manipulation operation such as a panning or zooming of the display in relation to a region selected by a user, the apparatus is arranged to carry out a function in relation to the underlying digital map data related to the selected region. The invention allows the user to interact with the digital map data via the displayed digital map, and control operations in respect of such data.

In accordance with the invention, the apparatus is arranged to carry out one or more mapping or navigation operations using the determined digital map data. Various examples of such operations will now be described. It will be appreciated that the apparatus may be arranged to carry out any or all of these functions.

In some sets of embodiments, the selected continuous region is a path indicative of a route the user wishes the apparatus to calculate, and the processor is arranged to calculate a route using the determined digital map data relating to the region selected by the user. The method may then comprise controlling the apparatus to perform such a step. The route is a route between a first location and a second location e.g. a start point and a destination. In these embodiments the selected continuous region may be of a generally linear shape.

While the route calculation may commence once the user has finished selecting the path, in some preferred embodiments the processor is arranged to calculate the route as the path is selected by the user. In other words, the route calculation may take place while the user is still selecting the path. The processor may be arranged to continuously calculate the route as the path is selected. Such embodiments are particularly advantageous, as the user may perform corrections or modifications to the calculated route "on the fly".

In preferred embodiments the display is a touch sensitive display, and the path is drawn on to the displayed map by the user touching the display. It will be appreciated that alternatively a path could be drawn on to the displayed map using a cursor based operation, or in other manners.

In these embodiments in which a route is calculated, regardless of whether the route is calculated as or after the path is selected by the user, the step of calculating a route comprises inferring at least a start point, a destination, and a direction of travel from the path selected by the user, and the processor is arranged to carry out such a step. The processor may then determine a route between the inferred start point and destination in the inferred direction of travel. These embodiments allow the user to indicate a desired start point, destination and direction of travel for a route calculation using one or more indications providing a selected region in the form of a path on the digital map, rather than having to navigate through various menu options to select the names of start point and destination in a conventional manner. It will be appreciated that the apparatus or processor may be arranged to carry out any of the steps below, and the method of controlling an apparatus may comprise controlling the apparatus to carry out any of the steps mentioned if not explicitly stated.

The direction of travel may be inferred by reference to the direction in which the path is drawn on to the displayed map.

The start point and destination may be inferred in any manner from the path selected by the user. The step of inferring involves using the determined digital map data. The processor may determine digital map data corresponding to the positions of the start and end of the selected path, and use this digital map data as the location of the start point and destination in the route calculation. In some cases, for example where the path is drawn on to a display by the user, there may be more than one possible start point or destination, as the start point and end point of the region may cover multiple sets of digital map data. In this situation any suitable algorithm may be used to infer a start point and destination. For example, the central point at the start or end of a path specified by the user may be taken as the start point or destination.

However, it will be appreciated that the path selected by the user may not be particularly accurate. It may be desirable that the user does not need to be precise in their specification of the start point and/or destination, with the processor being able to determine a precise start point and/or destination from a selected path which provides a schematic indication of a path for use in route calculation. It will be appreciated that references to the "indicated" start point, destination, route, via point etc. below refer to the start point, destination etc indicated by the selected path. In some preferred embodiments the path selected by the user provides an indication of an approximate start point and/or destination for a route calculation, and the processor is arranged to determine a precise start point and/or destination for a route calculation from the approximate start point and/or end point indicated by the selected path. The precise start point and/or destination determined by the processor is in proximity to the approximate start point and/or destination and may or may not be within the selected region. There may be one or more possible precise start points or destinations which could be inferred from a single path selected by the user. In this case, the processor may select between the possibilities in any manner e.g. according to predetermined criteria, which may be user specified, or in accordance with a preset algorithm etc., or may present the options to a user to enable the user to make a selection.

In some embodiments the processor is arranged to determine digital map data corresponding to the approximate start point and/or destination indicated by the selected path, and search for a precise start point and/or destination to be used in the route calculation in proximity to the indicated start point and/or destination. The method of the invention may comprise controlling the apparatus to perform such a step. The step of searching for a precise start point and/or destination may be carried out in any suitable manner. The processor searches among digital map data. The digital map data will typically be digital map data relating to the displayed map, but may not be digital map data relating to parts of the map encompassed by the selected region. The proximity within which the processor searches may be set as desired. For example the apparatus may only be set to search for features/stored locations in a region included in the path selected by the user, or within a predetermined distance thereof. In some situations, the start point may be taken as being the current position of the user if this is in proximity to the indicated start point.

In some embodiments the step of determining the precise start point and/or destination may comprise trying to match the approximate start point and/or destination indicated by the selected path to significant map features in the proximity of the indicated start point and/or destination. In some embodiments the step of searching for a precise start point and/or destination in proximity to the approximate indicated start point and/or destination may thus comprise the step of searching for significant map features in the proximity of the indicated start point and/or destination. For example, significant map features may include towns, villages, major roads, road crossings etc. The processor may then take a found significant map feature in the proximity of the indicated start point and/or destination as the precise start point and/or destination.

Alternatively or additionally, in some embodiments the step of determining the precise start point and/or destination may comprise trying to match the approximate indicated start point and/or destination of the selected path to specified locations in the proximity of the indicated start point and/or destination. The specified locations are preferably stored locations. The apparatus may then comprise a memory storing specified location data. In these embodiments the apparatus may search among the stored specified location data of the memory. However, it is envisaged that specified location data could be stored remotely and accessed by the apparatus, or accessed in other manner, e.g. by downloading etc. In embodiments, the step of searching for a precise start point and/or destination in proximity to the approximate indicated start point and/or destination of the selected path may comprise searching among (stored) specified location data to determine whether a (stored) specified location is present in the proximity of the indicated start point and/or destination. Preferably the processor then takes a found (stored) specified location in the proximity of the indicated start point and/or destination as the precise start point and/or destination.

The way in which the processor carries out the search may be preset in manufacture, and/or set as a user preference. For example, the processor may be arranged to search among the specified location data first and, if no specified location is found in the proximity of the indicated start point and/or destination, then to search for significant map features in the proximity of the indicated start point and/or destination. In a simple arrangement, the processor may only search among significant map features.

The specified location data may be preset data i.e. data set during manufacture or initial set up of the apparatus and/or user set data. The data may be general specified location data and/or user specific specified location data. The user specific specified location data may include user stored data and data stored by the apparatus. Examples of specified location data include points of interest (POI) location data, address book entries, favourite location data, home location data, work location data, business related location data, contact location data, recently visited location data, frequently visited location data etc. The different types of specified location data may be stored in a plurality of categories, e.g. POI, favourite locations, business locations, recently visited locations etc. In embodiments the specified location data comprises one or more of favourite location data, point of interest location data, home location data, work location data, recently visited location data, address book entries and contact location data. As set out above, the specified location data is preferably stored specified location data, and any references to specified location data preferably relate to stored specified location data.

The processor may be arranged to search for (stored) specified location data in proximity to the indicated start point and/or destination of the selected path in different categories and take a found (stored) specified location from one category as the start point and/or destination in preference to a found (stored) specified location from another category. The processor may be arranged to search through the categories in a predetermined order, or may be arranged to only search among a certain category or categories. The processor may search among the categories according to user preferences. For example the user may specify that only business locations should be searched, or that any favourite location should be taken as the start/destination point in preference to other stored locations such as POI etc.

The processor may be arranged to take into account a time when selecting a category of (stored) specified location data within which to search. The time may be a current time, or a specified time at which the route is to be travelled. For example, at a certain time of day or of week when the user is expected to be at work, the processor may default to search (first) among work locations, while at another time of day or week e.g. weekends, the processor may (first) search among family locations. Thus, in embodiments the processor may take into consideration a time when searching among different categories of (stored) specified location data, and may derive different (stored) specific location data in respect of the same selected path depending upon the time. Other factors which may alternatively or additionally be taken into account when determining the way in which a search among location data is to be performed may include weather, user's previous actions, user profiles etc.

The processor may directly proceed with a route calculation once a suitable start point and destination has been determined. In some embodiments the apparatus may be arranged to suggest one or more possible start points and/or destinations inferred from the selected path. This may enable the user to either confirm a precise start point and/or destination determined by the processor, or to select from multiple possibilities. The options may then be presented to the user to enable the user to make a selection from among the possible start points and/or destinations for use in the route calculation. The options may be presented in a menu type format, or may be presented sequentially, for example with a second option only being presented if the user declines the first.

The processor may automatically calculate a route between the start point and destination once established in the inferred direction using conventional techniques. In effect, the path selection provided by a user eliminates the usual series of operations required to specify a start point and destination. Once these have been established, route calculation may proceed in a conventional manner e.g. in accordance with preset or user set preferences e.g. quickest route, most scenic route, avoiding ferries etc.

In some embodiments the processor is arranged to additionally infer a route between the start point and destination from the path selected by the user, and the method includes controlling the apparatus to carry out such a step. The step of inferring a route may be carried out in a similar manner to the step of inferring a start point and/or destination discussed above. In embodiments the processor is arranged to determine a precise route between the start point and the destination from an approximate route indicated by the path selected by the user. The step of inferring the route from the selected path may comprise trying to match at least part of the selected path to specified e.g. stored specified routes and/or significant routes in the proximity of the selected path. The processor may be arranged to try to search among the digital map data for significant routes in the proximity of at least a part of the selected path, and the method may involve controlling the apparatus to perform such a step. The apparatus may comprise a memory storing specified route data. The processor may be arranged to determine whether a (stored) specified route or a part thereof is present in the proximity of at least a part of the selected path. For example the (stored) specified route may be a frequently travelled route or favourite route. The processor may be arranged to use a found (stored) specified route or significant route as at least a part of the calculated route. The processor may take into account a time when determining among which stored specified route data to search as described above in relation to determining a start point and/or destination.

The step of inferring the route may comprise inferring one or more via points from the path selected by the user. The processor may be arranged to determine one or more precise via points from an approximate via point or points indicated by the path selected by the user. This may be done in any suitable manner, for example in any of the ways described above in relation to inferring a start point or destination. The apparatus may be arranged to search among the digital map data for significant map features in the proximity of at least a part of the indicated path, and the method may involve controlling the apparatus to perform such a step. The processor may be arranged to determine whether a specified location e.g. a stored specified location is present in the proximity of the indicated path. The apparatus may comprise a memory storing specified location data, and the processor may be arranged to search among the stored specified location data. In embodiments the specified location data comprises one or more of favourite location data, point of interest location data, address book entry data, home location data, work location data, recently visited location data, and contact location data. The processor may be arranged to use a found specified location or significant map feature as a via point in the calculated route. The processor may take into account a time when determining among which specified location data to search as described above.

Where multiple possibilities are found, the processor may be arranged to select between the possibilities based upon user preferences and/or present the possibilities to a user to make a selection.

In further embodiments the route calculated by the processor using the digital map data determined from the selected region is an itinerary. The itinerary may include a start point, a destination, a direction of travel, one or more via points between the start point and destination, and an order of travel between the one or more via points. In these embodiments the processor may be arranged to additionally infer from the selected path one or more via points between the start point and destination, and an order of travel between the one or more via points. The processor may additionally infer a route between the one or more via points from the selected path. This may be done in the manner described above in relation to the route calculation. The via points may be intermediate destinations or points where it is intended to stop briefly.

Any of the above embodiments in relation to calculating a route e.g. determining start point, destination, route, via points and/or itinerary may be used in conjunction with embodiments in which the route is calculated as the user selects the path or in which the route is calculated after the user has finished selection of the path.

It will be appreciated that the above embodiments involve determining the digital map data relating to the selected path and using the data in order to calculate a route from the path selected by the user. The apparatus determines which digital map data is included in at least part of the path, so that a route may be calculated passing through these portions, or locations/routes in proximity thereto. Thus, for example the step of searching for a start point or destination in proximity to an indicated start point or destination involves using the determined digital data relating to the selected region to determine the point(s) in relation to which to search.

The processor may cause the calculated route to be displayed on the displayed map, and the method performed may comprise the step of displaying the route. The user may then accept the route or modify it according to conventional techniques or other techniques discussed herein. In embodiments in which the route is calculated as the user selects the path, the calculated route may be displayed as the path is selected by the user. This may enable the user to modify a route by adapting the selection of the path in view of a calculated part of the route based on an already selected part of the path.

In any of its embodiments, the method performed may further comprise using the calculated route in a navigation operation i.e. guiding the user along the calculated route. In these embodiments the processor may be arranged to provide appropriate instructions to guide the user along the calculated route.

While the invention has been described by way of example, in relation to the selection of one path, it will be appreciated that in accordance with the invention, more than one path may be selected simultaneously, and the apparatus may be arranged to simultaneously calculate a plurality of routes using digital map data relating to each of a plurality of respective selected paths. Thus, in embodiments, the selected path may be a first path indicative of a first route to be calculated, and the apparatus may be arranged to receive one or more indications from a user of a second selected path indicative of a second route to be calculated, and may calculate a second route using digital map data relating to the second selected path. The second path may be indicated by a second user. In this way multiple paths may be indicated simultaneously by multiple users, and multiple route calculations performed simultaneously. The calculated routes may be displayed simultaneously. This may allow multiple users to interact with the apparatus in a manner permitting them to propose and calculate routes simultaneously, much as one might do when discussing routes using a paper map.

The above set of embodiments is concerned with a mapping or navigation operation involving calculating a route from a path selected by a user, and the selected continuous region is a path indicative of a route the user wishes to be calculated. In accordance with another set of embodiments the continuous region selected on the digital map by the user includes a region of the displayed map to be included or avoided in a route to be calculated, and the processor is arranged to calculate a route which includes or excludes at least a part of the selected region using the determined digital map data. Thus in these embodiments, the user selects a region which they wish to go via or avoid in a route calculated by the apparatus. The method of operating the mapping or navigation apparatus may comprise controlling the apparatus to perform a method comprising the step of calculating a route which includes or excludes at least a part of the selected region using the determined digital map data. Thus in these embodiments, the user selects a region which they wish to go via or avoid in a route calculated by the apparatus.

In these embodiments the processor may be arranged to cause the route once calculated to be displayed on the digital map, and the method performed by the apparatus may comprise the step of displaying the calculated route on the digital map.

The region to be included or avoided may be selected before a route is proposed. Thus the indication of the selected region may form part of the process of planning a route. In some embodiments the continuous region is selected on a displayed digital map which does not include a displayed route.

In other embodiments the processor is arranged to cause a proposed route to be displayed on the digital map, and the selected region includes a region of the map to be included or avoided in a modification of the proposed route. The processor may be arranged to first carry out the step of calculating the proposed route, although the route could be obtained in another manner, e.g. being retrieved from stored routes. The method performed may include the step of displaying a proposed route on the digital map, and may further comprise the step of calculating the proposed route.

In these embodiments the route calculated using the determined digital map data is a modification of the proposed route which includes or excludes at least part of the selected region. The processor may cause the modified route to be displayed, and the method performed may comprise the step of displaying the modified route. Thus in these embodiments the apparatus modifies a proposed route using the determined digital map data relating to the selected region. These embodiments are advantageous as the user may simply indicate a change to a proposed route without needing to go through a range of menu options.

The apparatus may determine whether the route is to be modified to include or exclude the selected region in any manner. For example the user may be able to specify a go via or avoid mode prior to selecting the region. In other embodiments the apparatus may be arranged to infer a modification to the proposed route from a shape and/or location of the selected region. If the selected region does not include a portion of the proposed route, the apparatus may infer that the user wishes to modify the proposed route to go via at least a part of the selected region, and may proposed a modified route going via at least a part of the selected region. If the selected region includes a portion of the proposed route, the apparatus may infer that the user wishes to modify the proposed route to avoid at least a part of the selected region, and may proposed a modified route avoiding at least a part of the selected region.

In embodiments the apparatus is arranged such that when the selected region does not include a portion of the proposed route, the processor is arranged to calculate a modified route going via at least a part of the selected region, and when the selected region includes a portion of the proposed route, the processor is arranged to calculate a modified route avoiding at least a part of the selected region. The method performed may comprise the steps of calculating a modified route going via at least a part of the selected region when the selected region does not include a portion of the proposed route, and calculating a modified route avoiding at least a part of the selected region when the selected region includes a portion of the proposed route. In these embodiments the processor may be further arranged to determine whether the selected region includes or does not include a portion of the proposed route, and the method may comprise controlling the apparatus to carry out such a step.

The selected continuous region indicated by the user may be of any shape in these embodiments. In preferred embodiments a selected continuous region is drawn on to the displayed map in a manner indicative of the desired change to the proposed route. For example the user may select a continuous region wiping out a portion of a proposed route. Such a region may be in the form of a scribbled out part of the map. While in embodiments the selected region is highlighted on the displayed map, it is envisaged that the selected continuous region could be shown as an erased portion of a displayed route. In other embodiments the user may indicate a selected continuous region in the form of an approximate path to be included in a modification of the route.

The selected region may be a region which the user wishes to go via or avoid for any reason in a route. By enabling a user to readily specify a region to go via or avoid in this way, the user may more readily customise planned routes without specifying preferences in advance, or if, for some reason, they wish to depart from any preset preferences. In this way a more flexible system may be provided. For example, the user may decide that they wish to go via a POI shown on the map display, or to avoid a major road. In some embodiments the processor is arranged to access and cause real time information relating to traffic to be displayed on the digital map, and the method comprises accessing and causing such information to be displayed on the map. In these embodiments, the selected region may include a region of traffic to be avoided in the calculated route. For example the region may be a region in which a traffic jam is indicated as being present.

In accordance with yet another set of embodiments the selected continuous region may be a selected region of interest, and the processor may be arranged to determine digital map data corresponding to at least part of the selected region, and to perform one or more mapping or navigation operations in relation to the selected region using the digital map data. In embodiments the operation(s) are carried out in relation to the selected region and not another region of the map. In embodiments the operation(s) are carried out only in relation to the selected region. In these embodiments the "selected region" includes a boundary and a region bounded by e.g enclosed by the boundary. It will be appreciated that the apparatus may be arranged to determine digital map data and perform one or more operations in respect of at least a part of the boundary and/or the bounded region of the selected region.

In accordance with these embodiments of the invention the step of determining digital map data relating to the selected region may comprise the processor determining a subset of digital map data from the displayed map including some, or all of the data corresponding to locations encompassed by the indicated selected region. For example it may be sufficient for the processor to determine only the data corresponding to the boundary of the selected region, or the processor may determine all digital map data included in the geographic area represented by the selected region of the displayed map. The processor may determine digital map data corresponding only to certain categories of data e.g. location within the selected region e.g. points of interest (POI), cities etc. The selection of the region effectively highlights the region of interest to the user.

The digital map data determined in accordance with these embodiments of the invention may be of any type, and may depend upon the operation to be performed in respect of the selected region. In some embodiments this could be specified by the user, e.g. by setting a mode of operation, or may be inferred depending upon the circumstances of use of the apparatus, the point in the operation of the apparatus at which region selection is invoked, time of day etc.

The digital map data may include digital map data in the form of navigation data. Navigation data relating to the selected region may include any data relevant to navigation in the selected region. The navigation data may be data relating to a road network of the selected region. Alternatively or additionally, the navigation data may include data relating to the attributes of location(s) or road(s) in the region. By way of example, attributes may include any or all of; direction of travel for one way roads, speed limits, level of scenicity, average wind direction or speed, closed hours, danger level, windingness, quality of surface etc. The attribute information may include attributes of interest in general to users intending to navigate a route, or to specific classes of user e.g. bikers etc. The navigation data may include point or area based locations. For example, the navigation data may include the positions of points of interest (POI), contacts, favourite locations, local search results etc in the selected region. Navigation data may also include position and/or velocity data relating to object(s) or person(s) i.e. moving object(s) or person(s) in the selected region.

It will be appreciated that navigation data may be stored with other types of digital map data, or may be provided separately to other forms of digital map data. For example, navigation data may be inferred, downloaded, added to other map data etc. Accordingly, it will be understood that operations involving digital map data in the form of navigation data may equally be carried out using mapping apparatus, rather than navigation apparatus, which are able to access digital map data in the form of navigation data.

By determining the digital map data relating to the selected region, the apparatus may carry out one or more operations in relation to the selected region. The determined digital map data at least allows the apparatus to determine which areas of the map are included in the region. The operation may comprise flagging the determined digital map data as being included in the selected region. This may facilitate carrying out subsequent operations in relation to the data. The apparatus may be arranged to carry out one or more of the operations described below.

The selected region may be a region in respect of which the user wishes a search to be carried out. In some embodiments the processor is arranged to perform a search for a given item or items of the selected region using the determined digital map data. In embodiments the apparatus further comprises a memory storing information regarding the location of given item(s), and the processor may perform a search among the stored data of item(s) present in the selected region.

The given item(s) may be a given road or location attribute, person(s) and/or object(s). Object(s) may include a selected type of map feature such as points of interest (POI) or speed cameras. In embodiments in which the item(s) are POI, the processor may be arranged to search among all POIs present in the region, or among only selected categories of POI, e.g. recently used POI categories, or POI categories relating to the mode of operation of the device e.g. leisure or business. The search may be carried out according to predefined settings and/or user defined settings or preferences. In some embodiments search may be for a road or location attribute, and may be for a given type of road or location attribute. By way of example, a road attribute may be any or all of; speed limit, level of scenicity, average wind direction or speed, closed hours, danger level, windingness, quality of surface.

The processor may be arranged to cause found item(s) to be displayed on the map.

The processor may be arranged to cause an alert or notification to be generated when the given item is found in the region. Such an alert or notification may be an audible and/or visual alert or notification.

In other embodiments, the region may be a region which the user wishes to monitor in respect of a given change. Thus, in embodiments the processor is arranged to monitor the selected region in respect of a given change in the region. The change may be a change in relation to the digital map data, for example a map correction or change in navigation data e.g. road or location attribute. The change may be the appearance or disappearance of a given object or person. For example the apparatus may be arranged to determine when a person or object crosses the boundary of the selected region into or out of the selected region. The change may be the occurrence of a specified event. The apparatus may be arranged to generate an alert or notification when the given change occurs. Such an alert or notification may be an audible and/or visual alert or notification.

In other embodiments the selected region may be selected by a user as part of a process to specify user preferences or customise settings. In embodiments the selected region may be used to designate a geographic region in respect of which the user wishes the apparatus to carry out certain functions. In embodiments the processor is arranged to set a designated region corresponding to the selected region in respect of which certain functions are to be performed by the apparatus. Such functions may include displaying the position of given item(s) e.g. the position of speed cameras, points of interest, providing an indication as to fuel prices, etc. The functions may be in relation to the digital map data. The apparatus may be arranged to carry out the one or more functions in relation the selected region and not to other regions. In embodiments the processor may be arranged to carry out the function(s) when the user is within the selected region. In embodiments in which the apparatus is a navigation apparatus, the processor may determine when the apparatus is within the selected region and carry out the function when the apparatus is within the selected region.

In other embodiments the selected region may be an alert region, wherein the user wishes to receive alerts regarding a given event or presence of an item within the selected region. Such an alert may be an audible and/or visual alert. In these embodiments the processor may be arranged to cause an alert to be provided in relation to determining the occurrence of a given event or the presence of an item within the selected region. The processor may be arranged to detect the given event or presence of an item within the selected region, and when the given event or presence of an item is detected, cause an alert to be provided. In embodiments the processor may be arranged to provide an alert when the user enters, leaves or is in the selected region. In embodiments in which the apparatus is a navigation apparatus, the processor may determine when the apparatus is within, enters or leaves the selected region and provide the notification or alert regarding the given event or item when the apparatus is in the selected region. In embodiments the processor is arranged to provide the alert upon the apparatus crossing a boundary of the region into and/or out of the selected region. The given event or item may be the presence of an item such as a speed camera, POI, traffic jam, entry or exit of a contact into the area etc. The item or event may be prespecified by a user.

In some embodiments the operation may comprise using the determined digital map data to display navigation data relating to the selected region. The navigation data may be all navigation data, or a subset of navigation data. For example the subset may be a particular category or categories of navigation data e.g. a particular road attribute etc. For example, the average wind levels for roads in the selected region may be displayed.

Accordingly, in these embodiments in which the apparatus is arranged to perform one or more operations in relation to the selected region, the processor may be arranged to perform one or more of the following operations using the determined digital data; a search for a given item or items in the selected region, monitoring the selected region in respect of a given change in the region, causing an alert to be provided in relation to determining the occurrence of a given event or the presence of an item within the selected region, displaying navigation data relating to the selected region, or setting a region in respect of which certain functions are to be performed by the apparatus.

In another set of embodiments, the selected region may be a region in respect of which the user wishes to provide a modification to the digital map data of the region, and the operation carried out may comprise determining digital map data for the selected region, and carrying out an operation comprising the modification of the digital map data of the region. In embodiments the modification involves adding navigation data received from a user. The modification may be carried out in response to a user input. The modification may be any form of change to the digital map data of the selected region. In some embodiments the modification is in relation to the digital map data in the form of navigation data relating to the selected region. The modification may be in relation to navigation data in the form of attribute information for a road or location in the region. The attribute may be any of the attributes discussed above. The user may provide navigation data in the form of attribute information for a given road or location in the region e.g. marking the route as scenic, dangerous, exciting etc, or providing an attribute score e.g. scenicity, windingness, surface quality etc. The apparatus may determine digital map data for the region and associate additional navigation data provided by a user with the existing digital map data.

Navigation or mapping apparatus may now include a function whereby a user may submit corrections to the map data if they find an inaccuracy. The present invention is applicable to a navigation or mapping apparatus including such a function. The present invention may, in another set of embodiments, provide the ability for a user to report map problems with greater ease. In some embodiments, the mapping or navigation operation carried out using the determined digital map data may comprise a correction of the determined digital map data. In these embodiments the selected region indicated by the user includes a region of the map in which a correction is required. In embodiments the map correction may comprise any one of the addition of a roundabout, reversal of the traffic flow direction for a one way street, the addition of a turn restriction, the blocking of a road.

In embodiments the processor may be arranged to infer the nature of a correction from the shape of the selected continuous region and/or a manner e.g. direction in which the region is indicated e.g. drawn on to the displayed map. This may be in terms of the gesture of a user drawing a region on to the displayed map via a touch sensitive display, or for example, the movement of a cursor operated by the user used to draw the region. For example, the apparatus may infer from a continuous region drawn on to a one way road in the opposite direction to the existing direction of traffic flow according to the digital map data that the direction of traffic flow should be reversed. A continuous region in the form of a circle drawn on to the map may indicate that roundabout is present. A continuous region extending over an existing road according to the digital map data may indicate that the road is blocked.

The principles of the present invention in any of its aspects and embodiments are applicable to any form of mapping or navigation apparatus. In preferred embodiments the apparatus is a navigation apparatus. One particular area of utility is in relation to portable navigation devices (PND). In embodiments, therefore, the mapping or navigation apparatus is an apparatus of a portable navigation device (PND). In accordance with a further aspect, the present invention provides a portable navigation device (PND) comprising the apparatus in accordance with any of the aspects or embodiments of the invention described. Accordingly, in embodiments of the invention, the method is a method of operating a mapping or navigation system of a portable navigation device.

The invention is also applicable to navigation apparatus which is provided as part of an integrated navigation system. For example the apparatus may form part of an in-vehicle integrated navigation system. In accordance with another aspect of the invention, the present invention provides a navigation system comprising a navigation apparatus in accordance with any of the aspects or embodiments of the invention described. Accordingly, in embodiments of the invention, the method is a method of operating a navigation apparatus of a navigation system. The navigation system may be an integrated in-vehicle navigation system.

Regardless of its implementation, a navigation apparatus of the present invention may comprise a processor, memory, and digital map data stored within said memory. The processor and memory cooperate to provide an execution environment in which a software operating system may be established. One or more additional software programs may be provided to enable the functionality of the apparatus to be controlled, and to provide various other functions. A navigation apparatus of the invention may preferably include GPS (Global Positioning System) signal reception and processing functionality. The apparatus may comprise one or more output interfaces by means of which information may be relayed to the user. The output interface(s) may include a speaker for audible output in addition to the visual display. The apparatus may comprise input interfaces including one or more physical buttons to control on/off operation or other features of the apparatus.

In other embodiments, the mapping or navigation apparatus may be implemented by means of an application of a processing device which does not form part of a specific mapping or navigation device. For example the invention may be implemented using a suitable computer system arranged to execute mapping or navigation software. The system may be a mobile or portable computer system e.g. a mobile telephone or laptop, or may be a desktop system.

In accordance with a further aspect of the invention there is provided a navigation or mapping apparatus, the apparatus comprising; a display for displaying a digital map to a user, a processor configured to access digital map data and cause a digital map to be displayed to a user using the display, and a user interface operable by a user to enable the user to interact with the apparatus; wherein the user interface is arranged to allow a user to select a region present in the digital map by providing one or more indications on the displayed digital map in use; and wherein in use, when a selection of a region present in the digital map is received from a user, the processor is arranged to determine digital map data relating to the region selected by the user, and to carry out one or more mapping or navigation operations using the determined digital map data, wherein the selected region includes a region of the map to be included or avoided in a route to be calculated, and the processor is arranged to calculate a route which includes or excludes at least a part of the selected region using the determined digital map data.

In accordance with a further aspect of the invention there is provided a method of operating a navigation or mapping apparatus, the method comprising controlling the navigation or mapping apparatus to perform a method including the steps of; accessing digital map data and using the accessed digital map data to display a digital map on a display of the apparatus; receiving from a user via a user interface of the apparatus a selection of a region present in the displayed digital map, wherein the user selects the region by providing one or more indications on the displayed digital map, determining digital map data relating to the selected region, and carrying out one or more mapping or navigation operations using the determined digital map data, wherein the selected region includes a region of the map to be included or avoided in a route to be calculated, and wherein the method performed further comprises calculating a route which includes or excludes at least a part of the selected region using the determined digital map data.

In accordance with another aspect of the present invention there is provided a navigation or mapping apparatus, the apparatus comprising; a display for displaying a digital map to a user, a processor configured to access digital map data and cause a digital map to be displayed to a user using the display, and a user interface operable by a user to enable the user to interact with the apparatus; wherein the user interface is arranged to allow a user to select a continuous region present in the digital map by providing one or more indications on the displayed digital map in use, and wherein, when a selection of a continuous region is received from a user in use, the processor is arranged to determine digital map data relating to at least part of the selected region, and to perform one or more operations in relation to the selected region using the digital map data.

In accordance with a further aspect of the invention, there is provided a method of operating a navigation or mapping apparatus, the method comprising controlling the navigation or mapping apparatus to perform a method comprising the steps of; accessing digital map data and using the accessed digital map data to display a digital map, receiving from a user via a user interface of the apparatus a selection of a continuous region present in the displayed digital map, wherein the user selects the continuous region by providing one or more indications on the displayed digital map; determining digital map data corresponding to at least a part of the selected region, and carrying out one or more operations in relation to the selected region using the digital map data.

The present invention in accordance with these further aspects or embodiments may comprise any or all of the features described in respect of the other embodiments of the invention to the extent that they are not mutually exclusive.

References to the "indicated region" or the "selected region" herein should be understood to refer to the indicated or selected region indicated by the user on the displayed digital map if this is not explicitly stated. References to the apparatus carrying out given steps may in general be understood as being steps carried out by, or under the influence, of the processor, unless the context demands otherwise.

The present invention extends to a computer program product comprising computer readable instructions executable to perform a method according to any of the aspects or embodiments of the invention.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed by the apparatus, it will be appreciated that any or all of these operations may be performed by the apparatus, in any combination, and the method may comprise controlling an apparatus to perform any of the operations.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present invention, and arrangements embodying those teachings, will hereafter be described by way of illustrative example with reference to the accompanying drawings, in which:

FIGS. 6 and 7 illustrate an embodiment in accordance with the invention as claimed involving a PND calculating a route using a selected region in the form of a path indicated on a displayed map by the user, of which FIG. 6 illustrates the path indicated by the user, and FIG. 7 illustrates the route calculated;

FIGS. 8 and 9 illustrate another embodiment involving a PND modifying a calculated route to avoid a selected region indicated on a displayed map by a user, of which FIG. 8 illustrates the way in which the user selects the region to be avoided, and FIG. 9 illustrates the modified route;

FIGS. 10 to 12 illustrate further embodiments involving setting a selected region in response to an indication on the displayed map by a user of which;

FIG. 10 illustrates the setting of a selected region using a multi touch gesture, and FIGS. 11 and 12 illustrate a method of setting a selected region in which the user sets a center point for the region as shown in FIG. 11 and the PND provides a boundary of increasing radius to enable the user to set a selected area of desired size as shown in FIG. 12.

DETAILED DESCRIPTION OF PREFERRED EMBODIMENTS

Preferred embodiments of the present invention will now be described with particular reference to a PND. It should be remembered, however, that the teachings of the present invention are not limited to PNDs but are instead universally applicable to any type of processing device that is configured to execute navigation software so as to provide route planning and navigation functionality. It follows therefore that in the context of the present application, a navigation device is intended to include (without limitation) any type of route planning and navigation device, irrespective of whether that device is embodied as a PND, a navigation device built into a vehicle, or indeed a computing resource (such as a desktop or portable personal computer (PC), mobile telephone or portable digital assistant (PDA)) executing route planning and navigation software.

It will also be apparent from the following that the teachings of the present invention even have utility in circumstances where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Figure 1:
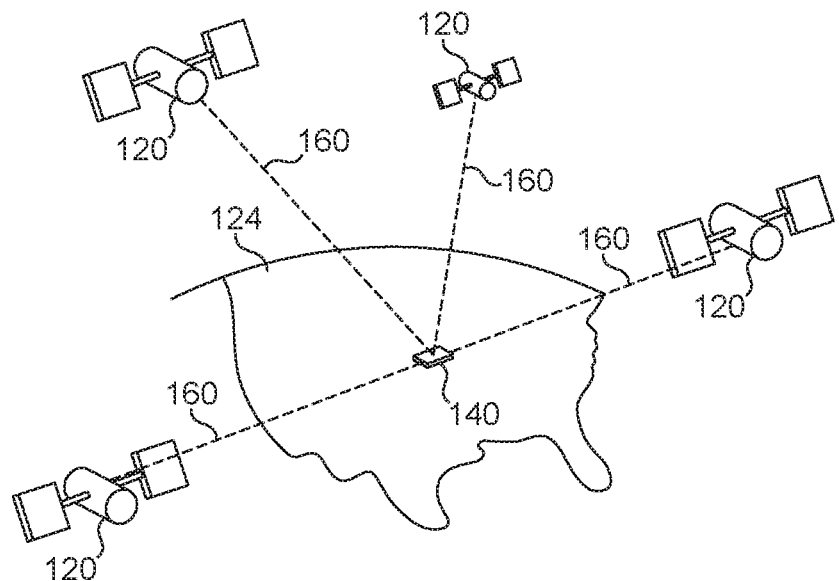
FIG. 1 is a schematic illustration of a Global Positioning System (GPS)

With the above provisos in mind, FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
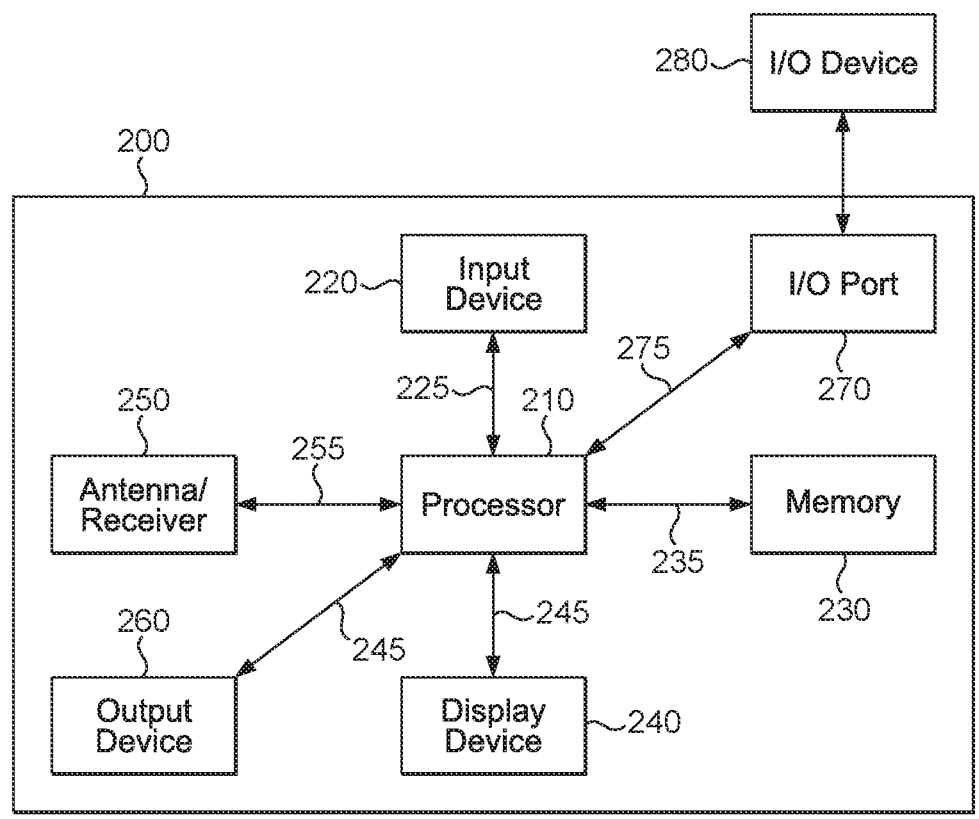
FIG. 2 is a schematic illustration of electronic components arranged to provide a navigation device.

FIG. 2 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In a particularly preferred arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information for a user of the navigation device 200, it is should equally be understood that input device 240 can include a microphone and software for receiving input voice commands as well.

In the navigation device 200, processor 210 is operatively connected to and set to receive input information from input device 220 via a connection 225, and operatively connected to at least one of display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectible to an I/O device 280 external to the navigation device 200. The memory resource 230 comprises, for example, a volatile memory, such as a Random Access Memory (RAM) and a non-volatile memory, for example a digital memory, such as a flash memory. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Figure 3:
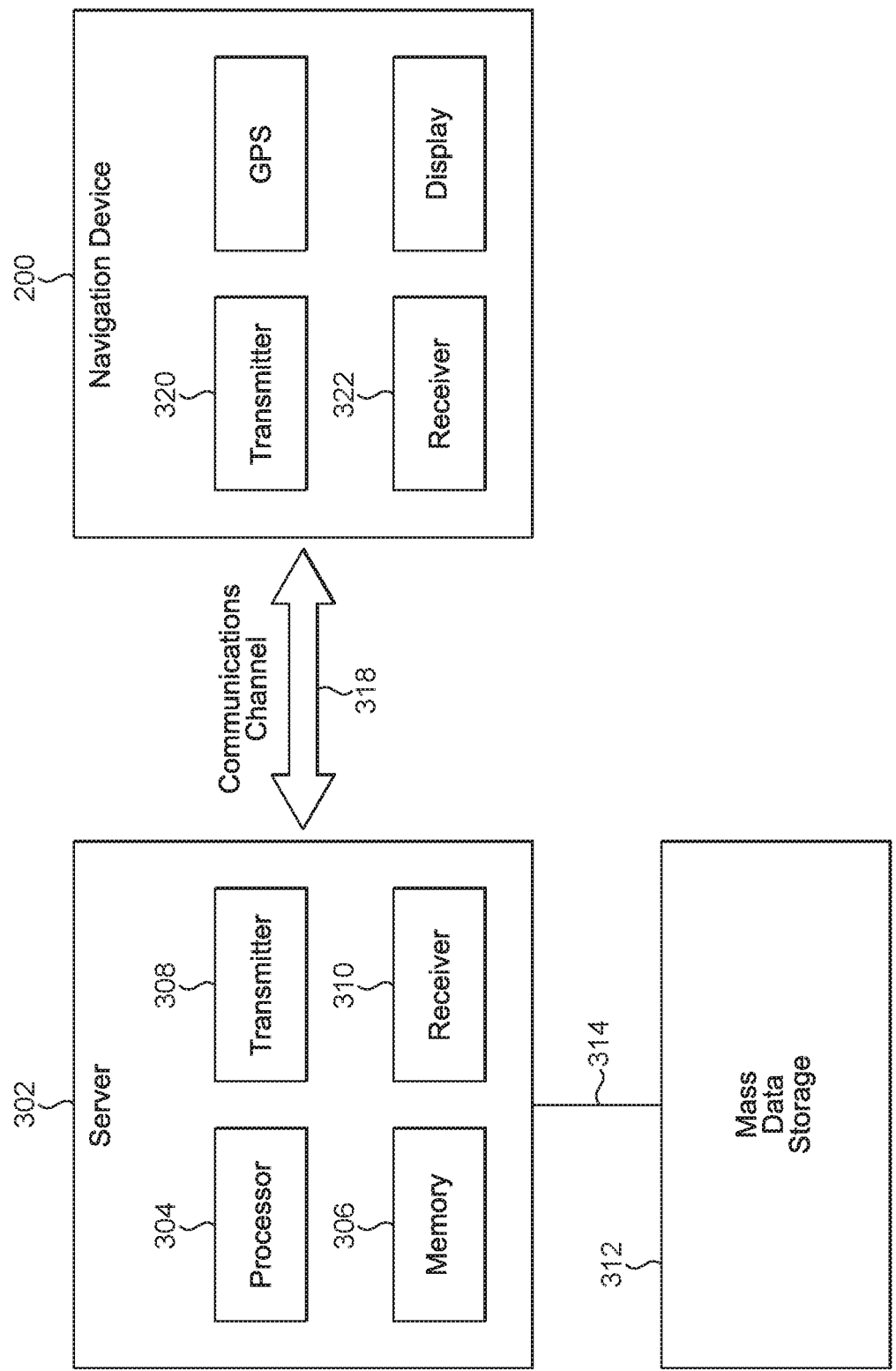
FIG. 3 is a schematic illustration of the manner in which a navigation device may receive information over a wireless communication channel.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GPRS, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GPRS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 260, such as audio input/output devices for example.

Figure 4A:
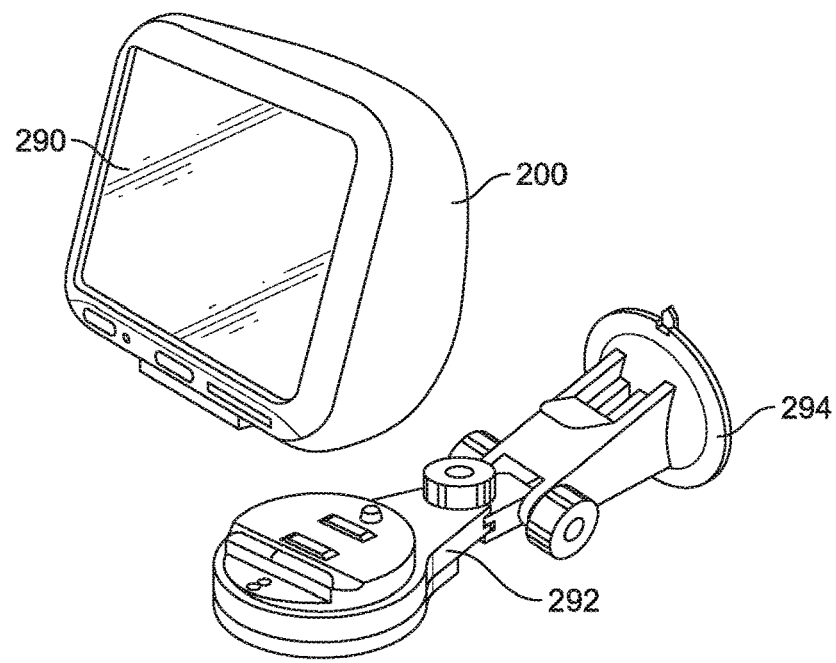
FIGS. 4A and 4B are illustrative perspective views of a navigation device.
Figure 4B:
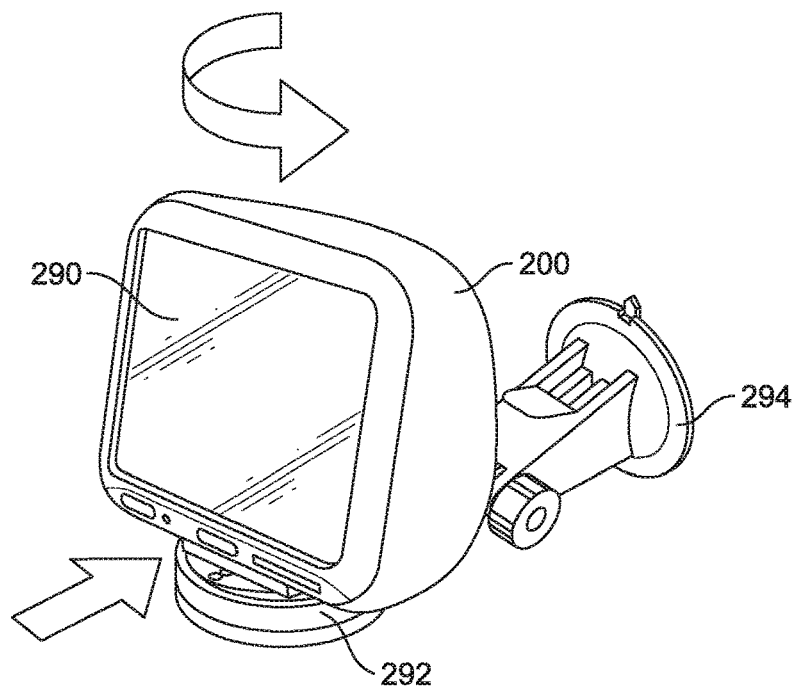

FIGS. 4A and 4B are perspective views of a navigation device 200. As shown in FIG. 4A, the navigation device 200 may be a unit that includes an integrated input and display device 290 (a touch panel screen for example) and the other components of FIG. 2 (including but not limited to internal GPS receiver 250, microprocessor 210, a power supply, memory systems 230, etc.).

The navigation device 200 may sit on an arm 292, which itself may be secured to a vehicle dashboard/window/etc. using a suction cup 294. This arm 292 is one example of a docking station to which the navigation device 200 can be docked.

As shown in FIG. 4B, the navigation device 200 can be docked or otherwise connected to an arm 292 of the docking station by snap connecting the navigation device 292 to the arm 292 for example. The navigation device 200 may then be rotatable on the arm 292, as shown by the arrow of FIG. 4B. To release the connection between the navigation device 200 and the docking station, a button on the navigation device 200 may be pressed, for example. Other equally suitable arrangements for coupling and decoupling the navigation device to a docking station are well known to persons of ordinary skill in the art.

Referring now to FIGS. 5*a-i* there is depicted a series of screenshots from a TomTom GO 950 LIVE navigation device. This model of TomTom PND has a touchscreen interface for displaying information to a user and for accepting input to the device from the user. The screenshots show an illustrative destination location input process for a user whose home location has been set to the offices in The Hague of the European Patent Office, and who wishes to navigate to a street address in Amsterdam, The Netherlands for which they know the street name and building number.

When this user switches on their TomTom PND, the device acquires a GPS fix and calculates (in a known manner) the current location of the PND. The user is then presented with a display showing in pseudo three-dimensions the local environment in which the PND is determined to be located, and in a region of the display below the local environment a series of control and status messages.

Figure 5A:
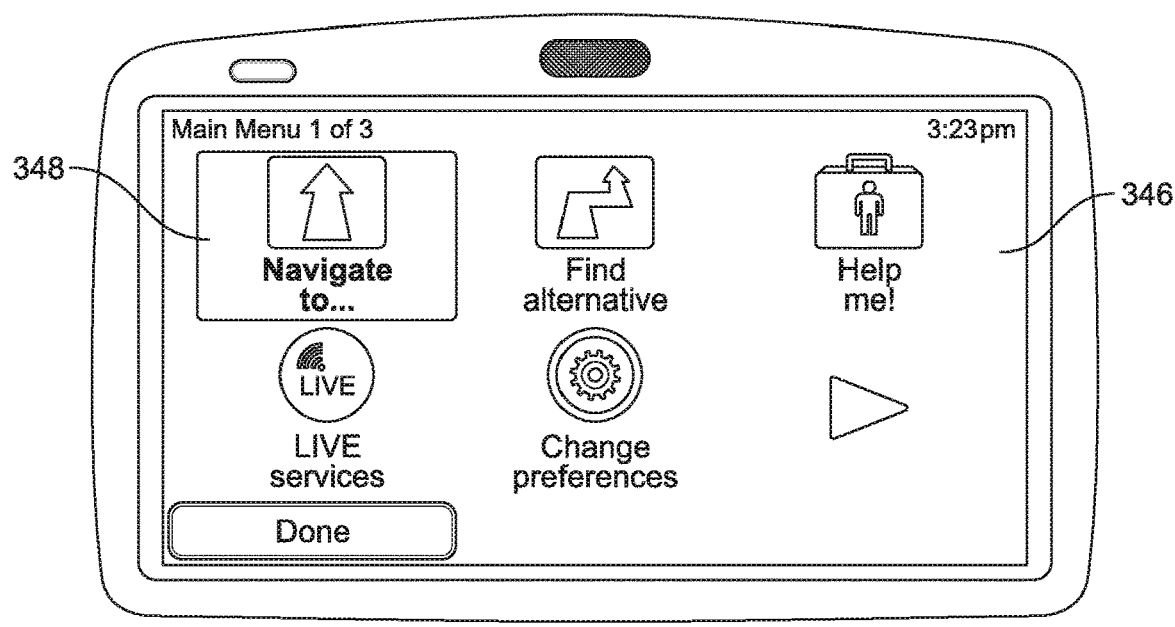
FIGS. 5a to 5i are illustrative screenshots from a TomTom GO 950 LIVE PND for a destination input process.

By touching the display of the local environment, the PND switches to display (as shown in FIG. 5*a*) a series of virtual buttons 346, 348 by means of which a user can, inter alia, input a destination that they wish to navigate to.

Figure 5B:
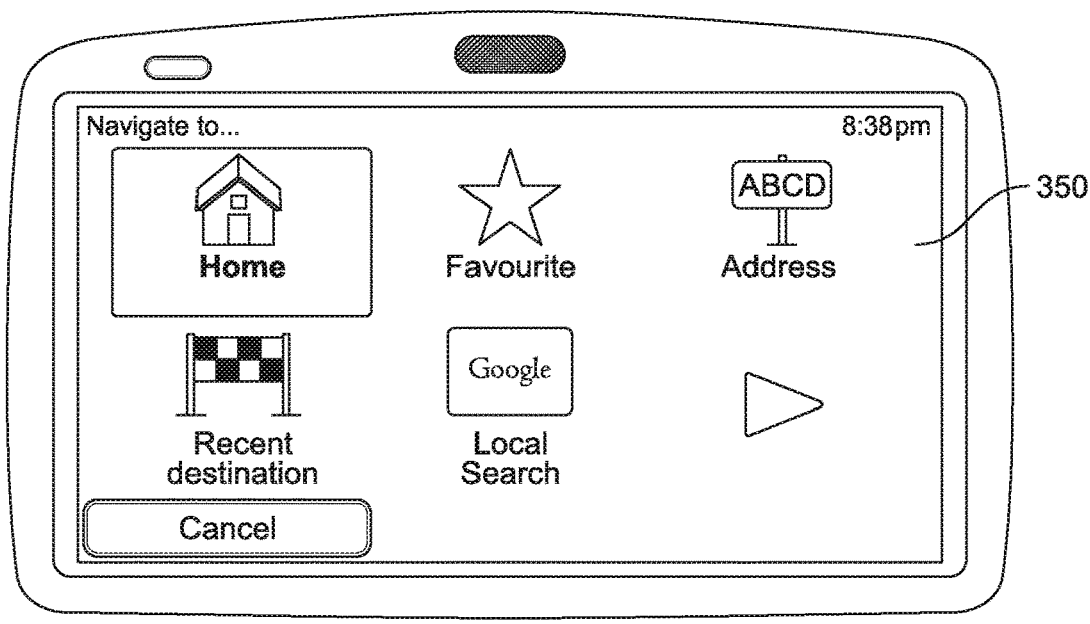

By touching the "navigate to" virtual button 348, the PND switches to display (as shown in FIG. 5*b*) a plurality of virtual buttons that are each associated with a different category of selectable destinations. In this instance, the display shows a "home" button that if pressed would set the destination to the stored home location. However, in this instance as the user is already at their home location (namely the EPO's offices in the Hague) selecting this option would not cause a route to be generated. The "favourite" button, if pressed, reveals a list of destinations that the user has previously stored in the PND and if one of these destinations is then selected the destination for the route to be calculated is set to the selected previously stored destination. The "recent destination" button, if pressed, reveals a list of selectable destinations held in the memory of the PND and to which the user has recently navigated. Selection of one of the destinations populating this list would set the destination location for this route to the selected (previously visited) location. The "local search" button, if pressed, allows the user to carry out a search for given items e.g. shops, services etc in the local area, or an area local to a given destination, using the Google local search service. The "arrow" shaped virtual button opens a new menu of additional options, and the "address" button 350 commences a process by which the user can input the street address of the destination that they wish to navigate to.

Figure 5C:
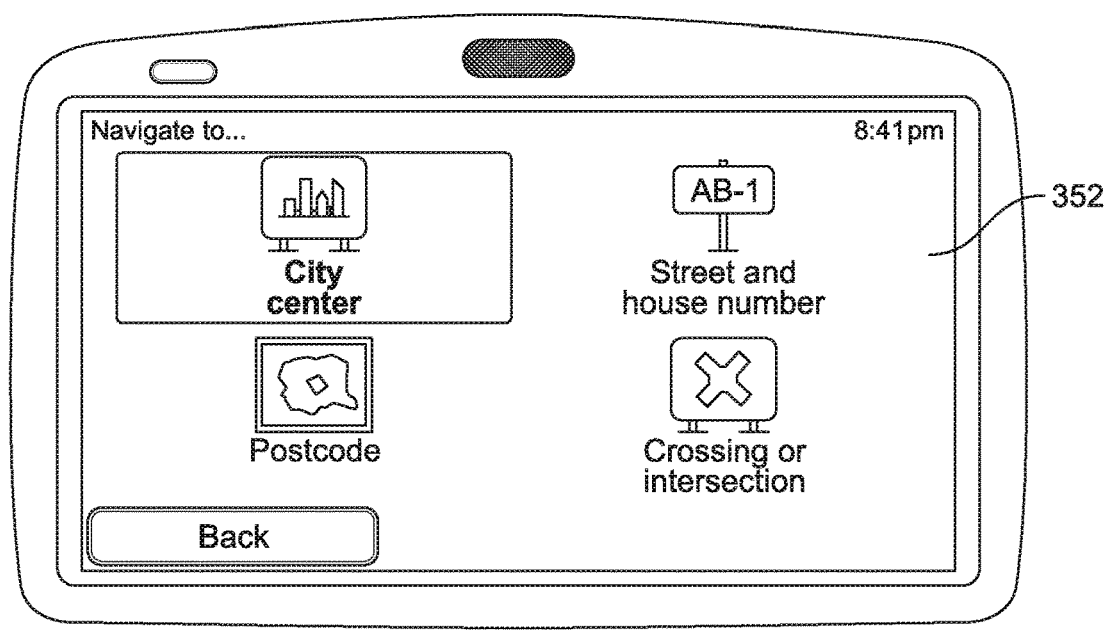

Since the user, in this example, knows the street address of the destination that they wish to navigate to, it is assumed that this "address" button is operated (by touching the button displayed on the touchscreen), whereupon (as shown in FIG. 5*c*) the user is presented with a series of address input options—in particular for address input by "city centre", by "postcode", by "crossing or intersection" (for example a junction of two roads) and by "street and house number".

Figure 5D:
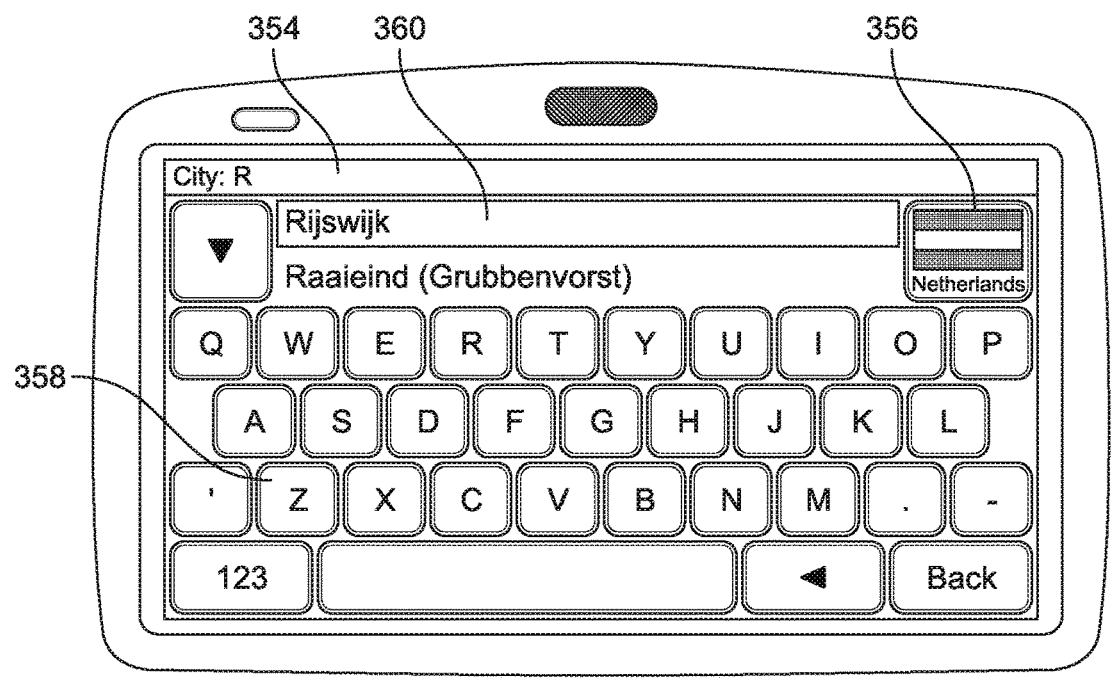

In this example the user knows the street address and house number of the destination and hence selects the "street and house number" virtual button 352 whereupon the user is then presented, as shown in FIG. 5*d*, a prompt 354 to enter the name of the city that they wish to navigate to, a flag button 356 by means of which the user can select the country in which the desired city is located, and a virtual keyboard 358 that may be operated by the user, if necessary, to input the name of the destination city. The PND therefore additionally provides the user with a list 360 of selectable cites.

Figure 5E:
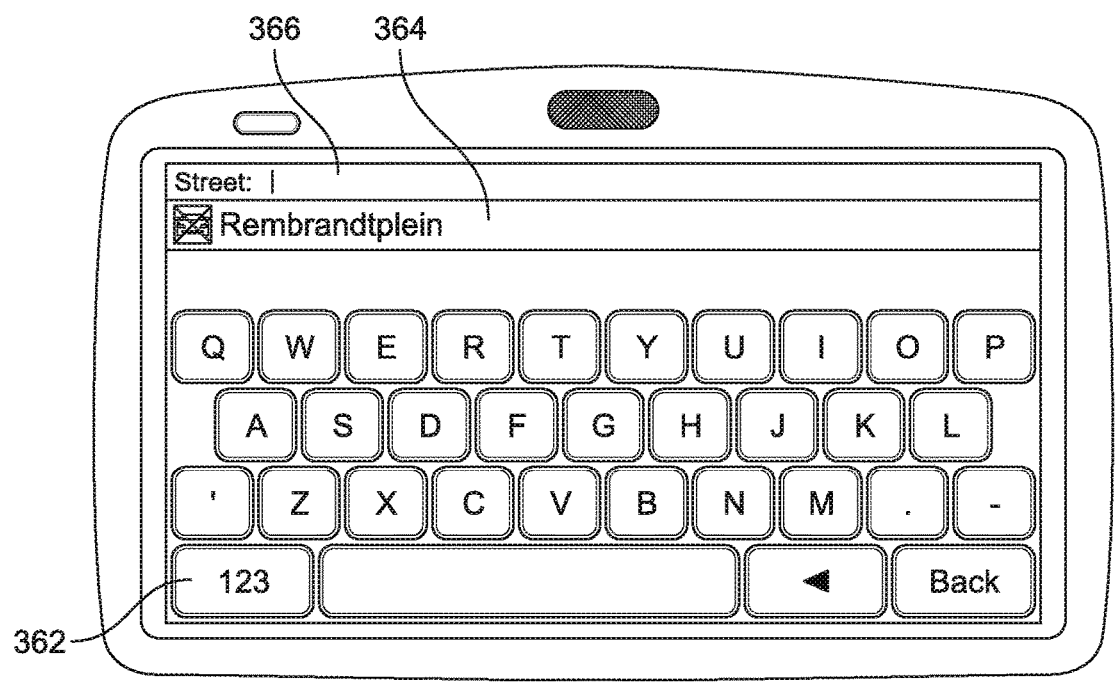

The user in this instance wishes to navigate to Amsterdam, and on selection of Amsterdam from the list 360 (involving scrolling through the list from the "R" entries) the PND displays, as shown in FIG. 5*e*, a virtual keyboard 362 by means of which a user can input street names, a prompt 366 for entry of a streetname and, in this instance, as the user has previously navigated to a street in Amsterdam, a list 364 of selectable streets in Amsterdam.

In this example the user wishes to navigate to the street, Rembrandtplein, that they have previously visited and so selects Rembrandtplein from the displayed list 364.

Figure 5F:
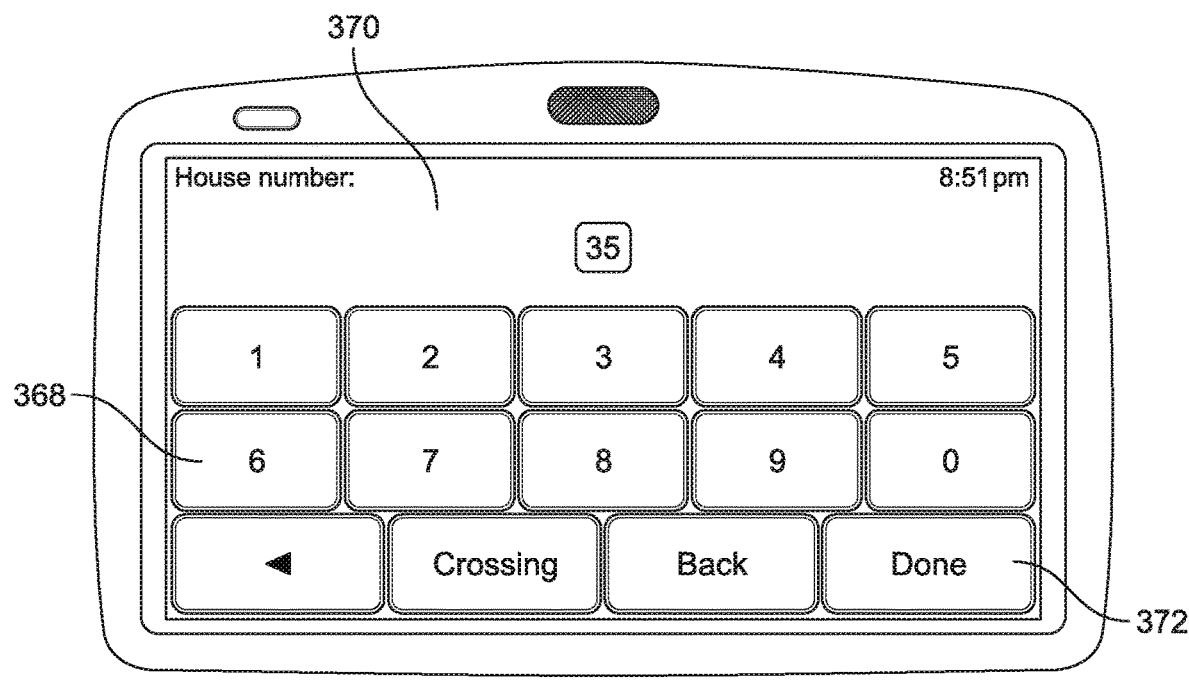

Once a street has been selected, the PND then displays a smaller virtual keypad 368 and prompts the user, by means of prompt 370, to enter the number of the house in the selected street and city that they wish to navigate to. If the user has previously navigated to a house number in this street, then that number (as shown in FIG. 5*f*) is initially shown. If, as in this instance, the user wishes to navigate to No. 35, Rembrandtplein once again, then the user need only touch a "done" virtual button 372 displayed at the bottom right hand corner of the display. If the user should wish to navigate to a different house number in Rembrandtplein, then all they need do is operate the keypad 368 to input the appropriate house number.

Figure 5G:
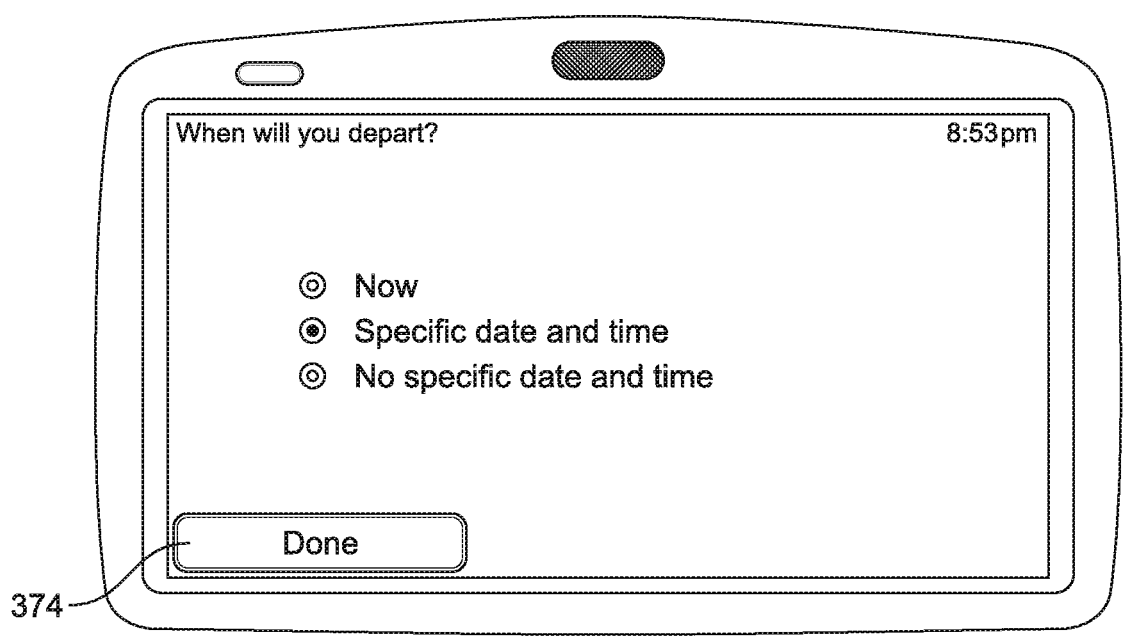

Once the house number has been input, the user is asked in FIG. 5*g*, whether they wish to depart, now, at a specific date and time or at no specific date and time. In this instance the user is not concerned about leaving at a particular time and hence selects the "no specific date and time" option and presses the "done" virtual button 374.

Figure 5H:
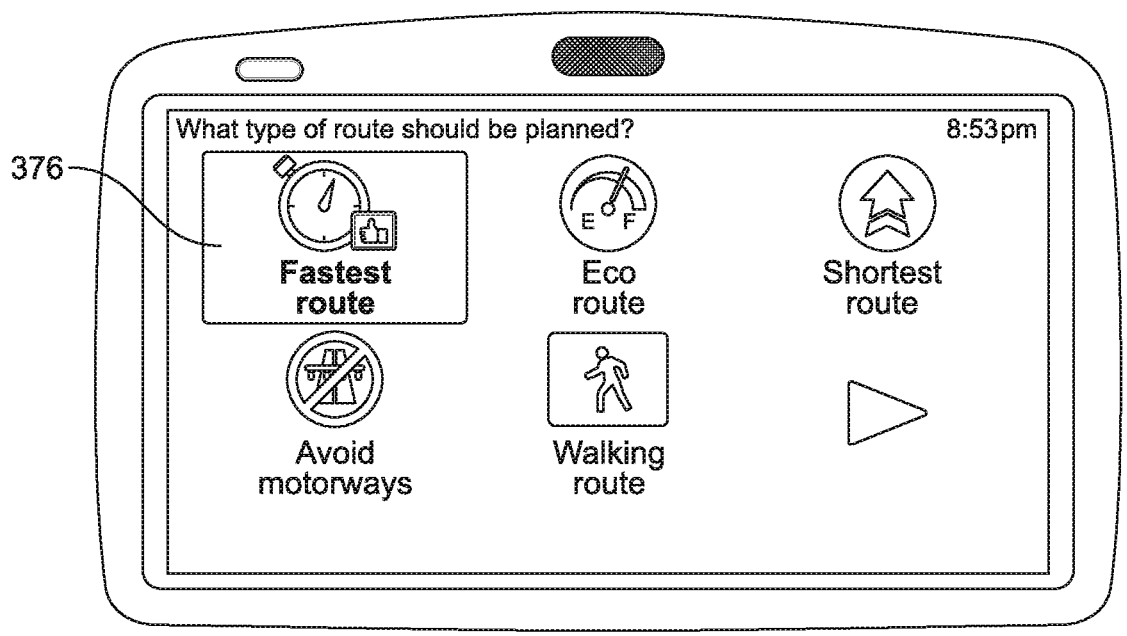
Figure 5I:
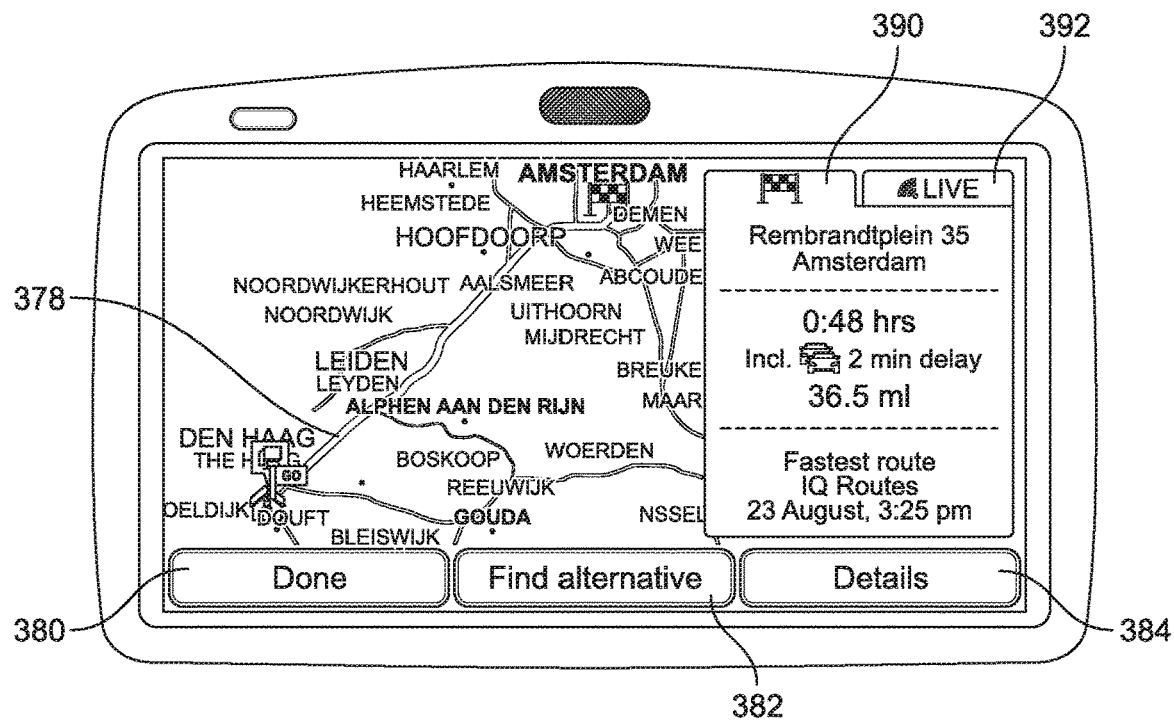

Selecting the "done" button 374 causes the PND to display a further set of virtual buttons as shown in FIG. 5*h* offering options as to the type of route the user wishes to calculate, for example the fastest route, an eco route, the shortest route, a route avoiding motorways, a walking route, or further options accessed by pressing the arrow shaped virtual button. In this case, the user selects the fastest route using button 376. This causes the PND to calculate a route between the current location and the selected destination and to display that route 378, as shown in FIG. 5*i*, on a relatively low magnification map that shows the entire route. The user provided with a "done" virtual button 380 which they can press to indicate that they are happy with the calculated route, a "find alternative" button 382 that the user can press to cause the PND to calculate another route to the selected destination, and a "details" button 384 that a user can press to reveal selectable options for the display of more detailed information concerning the currently displayed route 378. The display includes a summary tab 390 providing a summary of the route information, and a further traffic tab 392 which the user may select to view detailed live traffic information for the route.

Some preferred embodiments of the invention will now be described by reference to FIGS. 6-12.

Figure 6:
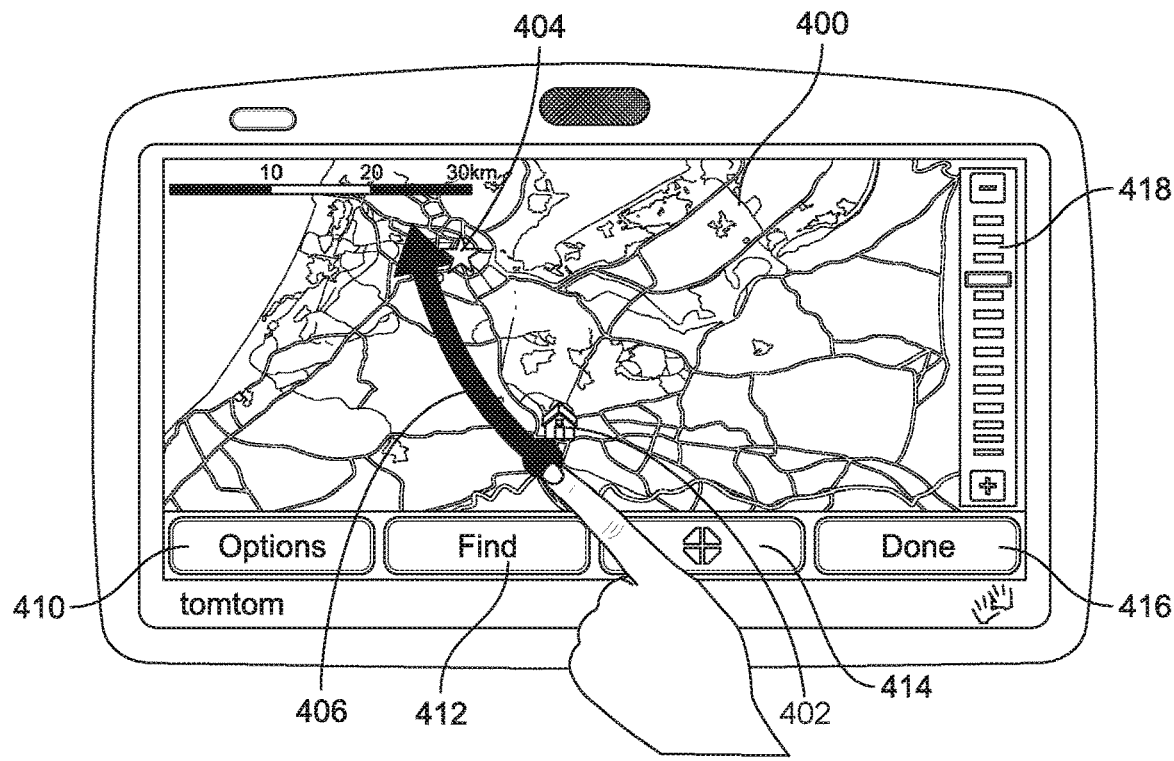

A first embodiment will be described by reference to FIGS. 6 and 7. This embodiment is concerned with a method by which a user may select a path indicative of a route to be calculated. FIG. 6 is a schematic representation of a display of a region of a map 400 in which region the user desires to calculate a route in accordance with an embodiment of the invention. The user will navigate to a display of a map region of interest such as that shown in FIG. 6 by a conventional operation. The display 400 includes a number virtual buttons including an "Options" button 410, a "Find" button 412, a "Panning" button 414 and a "Done" button 416. The find and panning buttons may be used to help the user navigate to the relevant area of the map for indicating a route. The map also includes a zoom control bar 418.

In the illustrated example, the displayed area of the map 400 includes the user's home location which indicated by the home icon 402. The user wishes to calculate a route between the home location 402 and a work location 404 indicated by the star symbol generally north east of the home location. In this example the user's home location is in Utrecht and the user's work location is in Amsterdam.

Rather than selecting the start point as being the home address, and inputting a destination in the manner described above in relation to FIGS. 5A-i via a series of menus, in this case the user simply draws their finger in the direction of the arrow 406 over the displayed map in a gesture generally indicative of the path of the route to be calculated. As the user performs this gesture, the selected path is highlighted on the display to provide the arrow 406 marked on the display 400. The processor determines from the direction in which the user traced the path on the display the desired direction of travel. In the embodiment illustrated this is indicated with the arrowhead.

When the user has drawn the desired path on the display they may press the "Done" button 416 so that the device proceeds to carry out a route calculation based on the schematically indicated path. The PND then determines the start point and destination for the schematic route indicated by the user. In this case, the PND recognises that the indicated start point is in the vicinity of the user's home address, and therefore selects the start point as the home address. The PND determines that the schematically indicated destination is in the vicinity of the user's work address, and therefore determines that the work address is the intended destination.

Figure 7:
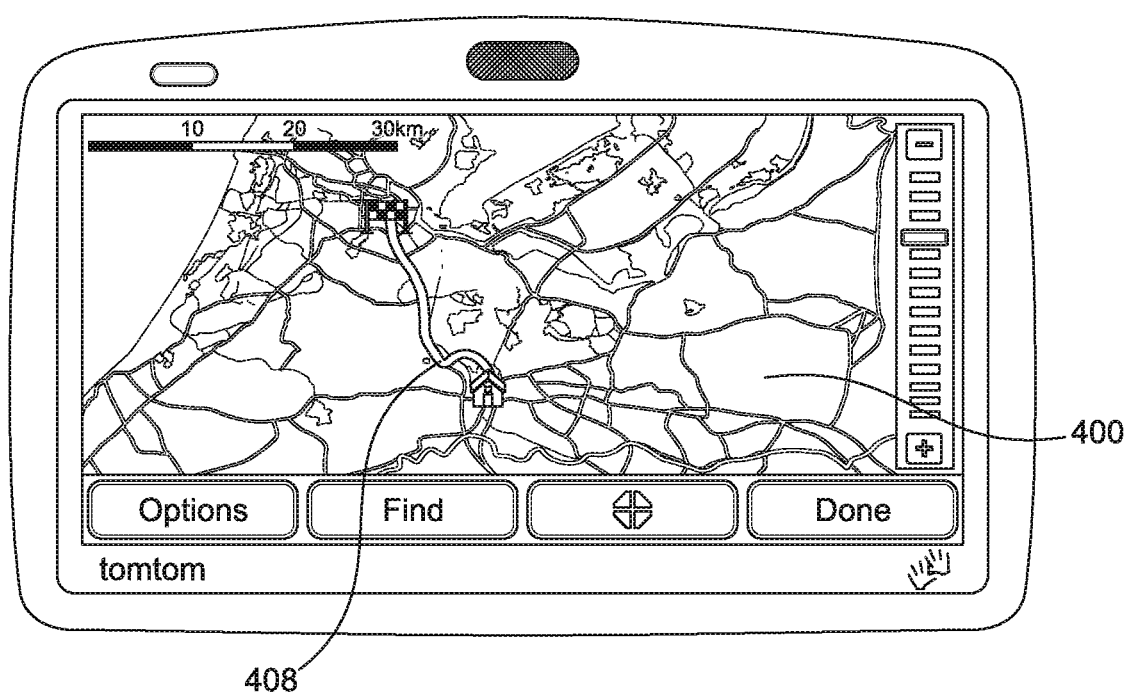

As shown in FIG. 7, the device then proceeds to calculate a route between the home and work addresses of the user, displaying the route 408 on the map display 400 in the same manner as when a route is selected using the conventional method described in FIGS. 5A-i. The PND retrieves digital map data for at least part of the region of the map included in the schematically indicated path 406 and uses the digital map data to determine a route.

It will be appreciated that in this instance the user only had to draw their finger over the display in order for the PND to infer the desired route to be calculated and present a calculated route, and did not have to go through a sequence of menu options to select the start point, destination and route options using speech or text based commands as illustrated by reference to the conventional method of FIGS. 5*a-i*. The necessary information may be inferred by the system from the path drawn by the user.

Alternatively, rather than waiting until the path has been drawn on to the displayed map, the PND may be arranged to calculate the route and/or search for a start point or destination continuously while the user is selecting the path. TomTom's "Instant Routing"™ software enables routes to be instantaneously calculated, and could be used to implement such an embodiment. This would allow for visualizing route options and/or determining or matching to locations while the user is still interacting with the displayed map. The user may then be able to make "on the fly" corrections to the route or path.

Regardless of when route calculation is performed, the PND may determine the detailed route, including the start point and end point from the schematic indication by the user in any one of a number of manners. The PND may be arranged to compare the schematically indicated start and destination points to stored locations, such as stored favourites, recently visited locations, home/work address, frequently visited locations, business locations, address book entries, leisure locations etc. The user may be able to set preferences as to how the PND will determine the detailed route. For example they may set that the PND should search first among favourites destinations when determining the detailed destination from the schematic destination, or alternatively among recently visited destinations. Another approach would be for the PND to match the start point and destination to significant map features e.g. towns, villages. This would avoid the need to take into account stored location information, and could provide a default in the event that no such stored information had been set, or if the user had not set preferences as to which categories of stored information should take precedence.

The PND may take into account the time of day or week when performing the search, and may search among different categories depending upon the time of day or week. The time may be the current time, or a time specified by the user e.g. when they plan to travel the route. For example, at a given time when the user is typically at work, e.g. weekday mornings, the PND may first search among stored work locations, while at weekends, the PND may search first among leisure locations. A different start point may then be determined for the same route depending upon the time of the day or week. Such time preferences may be set by the user depending upon their usual habits, working patterns etc. Other conditions which may be taken into account when searching for locations may include weather, or a user's previous actions, e.g. a derived user profile which may be derived by the PND from e.g. historical visiting profiles, or set by a user via their website etc.

In the event that the PND finds more than one possible option for the start point or destination, or simply to confirm the selection, the user may be presented with a menu of options from which to select, with the most likely, or preferred type of start point/destination e.g. a favourite at the top of the list. This may proceed in a similar manner to suggesting destinations using conventional systems, which may proposed recently visited destinations or favourite destinations from which the user may make a selection. Alternatively, to minimise the inputs required from the user, the PND may simply present the user with a calculated route based on its inferences in accordance with preset preferences, or most likely destination/start point inferred from the schematic indication.

The system may calculate the detailed route between the start point and destination once established according to preset preferences in the same manner as when the start point and destination of a route are conventionally indicated in the manner described with respect to FIGS. 5a-i. For example the PND may take into account preset preferences such as the user's desire to calculate the fastest route or a walking route. These may have been preset or could be set in response to a further menu displayed by the device prior to calculation of the route.

In exemplary embodiments the PND may additionally match the schematically illustrated route between the start point and destination, or parts thereof, to nearby significant map features such as major roads, or to stored locations or sections of route, such as a recently travelled sections of road, or a frequently travelled section of road, and use such points or stretches of route in the route calculation. In other words, rather than simply inferring the start point, destination and direction of travel from the schematically indicated path, and calculating a route in accordance with conventional techniques, the PND may additionally infer at least parts of the detailed route between the start point and destination from the path drawn by the user. In this way, the PND may calculate a detailed route likely to accord with the user's intention, without the user needing to make further selections. This may be carried out in a similar manner to the matching of destination and start point locations. This may be carried out in a similar manner to when a start point and/or destination are determined as discussed above, and may involve taking into account a time to determine how to search for routes, or via points.

It is envisaged that if the user wanted to cancel or restart the route after starting to draw it on the display, they could do so using a different type of gesture which would be recognised by the PND. For example the device may be arranged to recognise a further wiping gesture, or a discontinuity in the path as indicative that the user wanted to start again.

Rather than just proposing a route as shown in FIG. 7, the device may calculate a detailed itinerary from the schematically indicated path, providing a route which goes via certain intermediate destinations or via points in a given order. This may involve matching the route to nearby map features or stored locations/routes in a similar manner to that described above in relation to the route calculation. The system may use route planning settings, and/or user preferences to infer an itinerary. The PND may infer intermediate destinations or via points from preset user preferences. For example the user may predefine that they wished to carry out a business trip, and the via point or destinations may be selected from stored contacts or favourites labelled as "Business Contacts" which are found to be near to the determined route. Alternatively the user may define that the itinerary is in relation to a "Leisure Trip", and the PND may search among favourites or stored locations which are marked "Leisure", or are point of interest (POI) locations. Point of interest categories might include restaurants, playgrounds, castles, etc. The time of day or week may be taken into account when performing the search. Alternatively, e.g. if the user has not set any preferences, the PND may take nearby significant map features such as towns or villages closest to the indicated path as via points or intermediate destinations in this itinerary.

It is envisaged that multiple users could simultaneously interact with a displayed digital map in the manner described by reference to FIGS. 6 and 7 to each draw a path on to the displayed map indicative of a route to be calculated. The PND may then simultaneously calculate and display the routes, enabling the users to discuss route options as they might conventionally using a large paper map.

Although the embodiments above have been described in relation to searching among stored location or route data, it is envisaged that searching may be carried out among any specified location or route data accessed by the apparatus in any manner, e.g. among inferred or downloaded specified location or route data etc. Stored specified location data may be stored by the memory of the apparatus or remotely from the apparatus.

Figure 8:
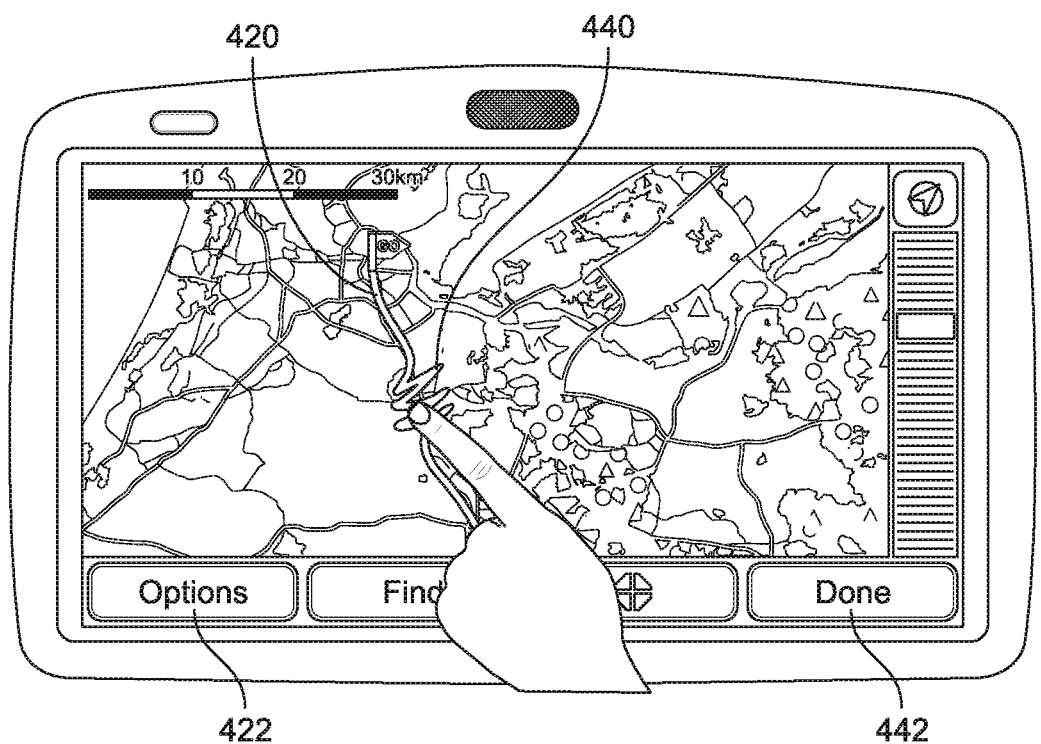

FIG. 8 shows another embodiment in which a route has already been calculated and displayed on the map for the user to review. The route may have been calculated in the conventional manner, or may have been calculated on the basis of a path schematically indicated by the user using a method as described by reference to FIGS. 6 and 7. In this instance the user wishes to modify the route so that it does not go via a particular town.

The detailed route calculated 420 is highlighted on the map as shown in FIG. 8. The display includes a number of virtual buttons including one button 422 denoted "Options". The user may enter the alternative route setting screen by selecting the "Options" button 422 when the detailed route is displayed as shown in FIG. 8. This may bring up certain options including calculating an alternative route, which may then enable functionality to allow the user to indicate the desired change. Alternatively the user may be able to directly modify the indicated desired modification when the detailed route is displayed as shown in FIG. 7 without needing to go through any further menu system.

Figure 9:
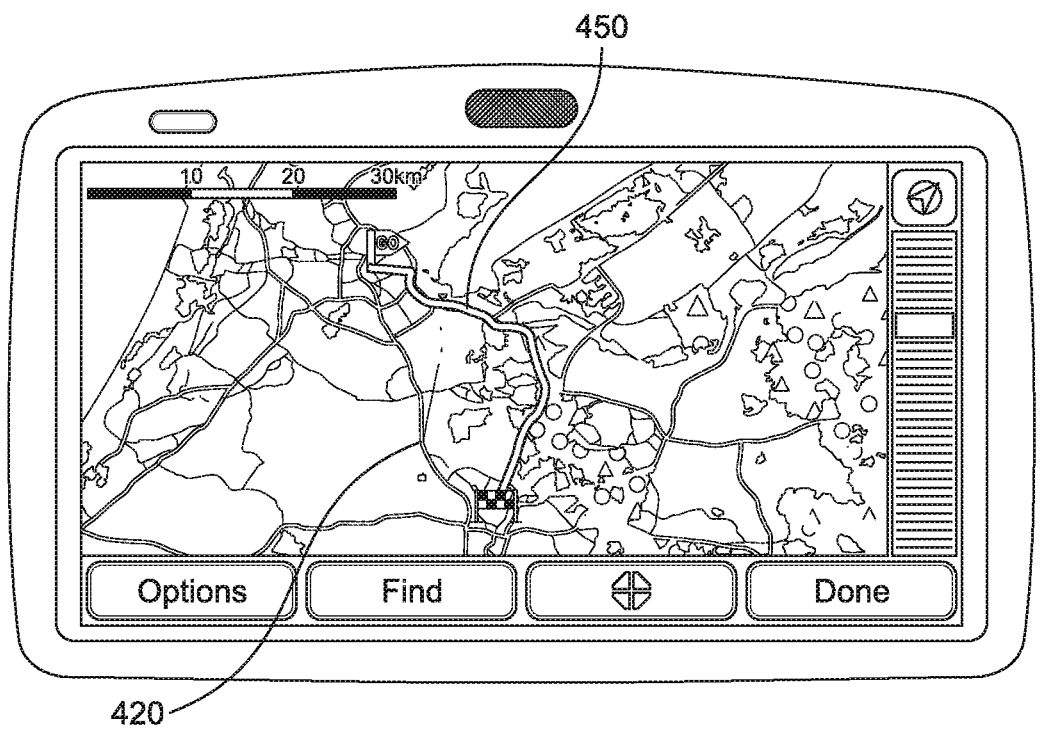

In order to inform the system that they wish to eliminate part of the route, the user performs a wiping type motion on part of the displayed detailed route 420. A wiped area 440 is displayed on the detailed route 420 corresponding to the user's indication. Once the user removes their finger from the screen, or in some cases, after pressing the "done" button 442, the PND then calculates an alternative route avoiding the indicated area. FIG. 9 illustrates the alternative route. This alternative route is marked as the path 450 in FIG. 9 alongside the original unmodified route 420. The PDA may display information about the alternative route, or a comparison of it to the original route in a similar manner to when a user invokes alternative route calculating functionality using conventional methods. For example, the system may provide details regarding the length or travel time of the alternative route in comparison to the original route, or the traffic levels on the alternative route. Thus it will be seen that the user was able to readily specify a change to the proposed route by directly indicating an area to be avoided on the displayed map, rather than going through menu options to specify the locations to be avoided after selecting a calculate alternative route option in a conventional manner. The system determines the digital map data corresponding to the indicated region to enable the modified route to be calculated. The apparatus may be arranged to infer a particular location or route to be avoided from the selected region indicated by a user in a similar manner to the embodiments of FIGS. 6 and 7 above, e.g. by searching for stored locations or significant map features located in the selected region. The search may take into account heuristic factors, e.g. a time of day in order to infer a location or feature to be included or avoided.

The part of the route to be avoided could be a part of the route the user wishes to avoid for any reason. The user may wish to override a route suggested on the basis of preset preferences. If the PND has displayed traffic information relating to the route, as would be the case for the GO 950 LIVE device, the area may be an area the user has decided to avoid as it is shown to have high levels of traffic.

If the user instead wished to modify the originally calculated route to go via a particular destination, the user could swipe their finger over the desired area to be included in the route in a similar manner to the way in which a part of the route was deleted in FIG. 8. The system may then calculate an alternative route in a similar manner. The system may determine that the indicated region is to be included or excluded depending upon whether it includes a part of the original route, or from the gesture used by the user to indicate the region. Rather than performing a wiping action, the user could instead draw an shape or line to indicate a region to be avoided or included in a route.

The route may be modified as the user selects the region to be included or excluded using an instantaneous route calculation algorithm as discussed above. Likewise, it is envisaged that multiple users may simultaneously select regions to be included or excluded in routes to be calculated or by way of modification of proposed routes, enabling the digital map to be used similarly to a paper map, as a tool to discuss possible route options.

In the examples shown in FIGS. 8 and 9, the user is shown as modifying an already calculated route. However, the same process could be used when initially setting a route, with the user indicating areas to be included or avoided in the route using similar gestures. Such an embodiment could be used if the user only wishes to exclude or include certain locations rather than indicating the entirety of the route as illustrated in FIGS. 6 and 7. For example, the user may already have indicated a start point and destination in a conventional manner, or by using gestures as shown in FIGS. 6 and 7. The PND may then invite the user to indicate areas to be included or avoided in the detailed route to be calculated before proceeding with a route calculation according to existing settings.

A similar approach may be used for the user to remove or avoid particular point locations such as intermediate destinations, way points or start or destination locations in a proposed route. The user may then indicate a location to be included or excluded by a manual gesture directly upon the displayed map. This may be carried out on a magnified view of the map.

Figure 10:
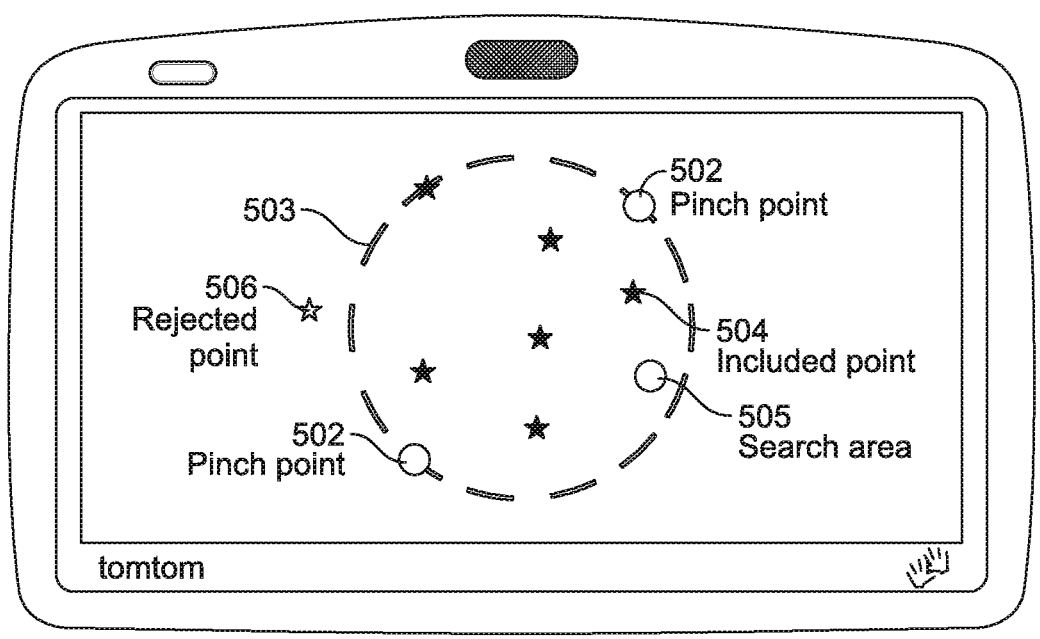
Figure 11:
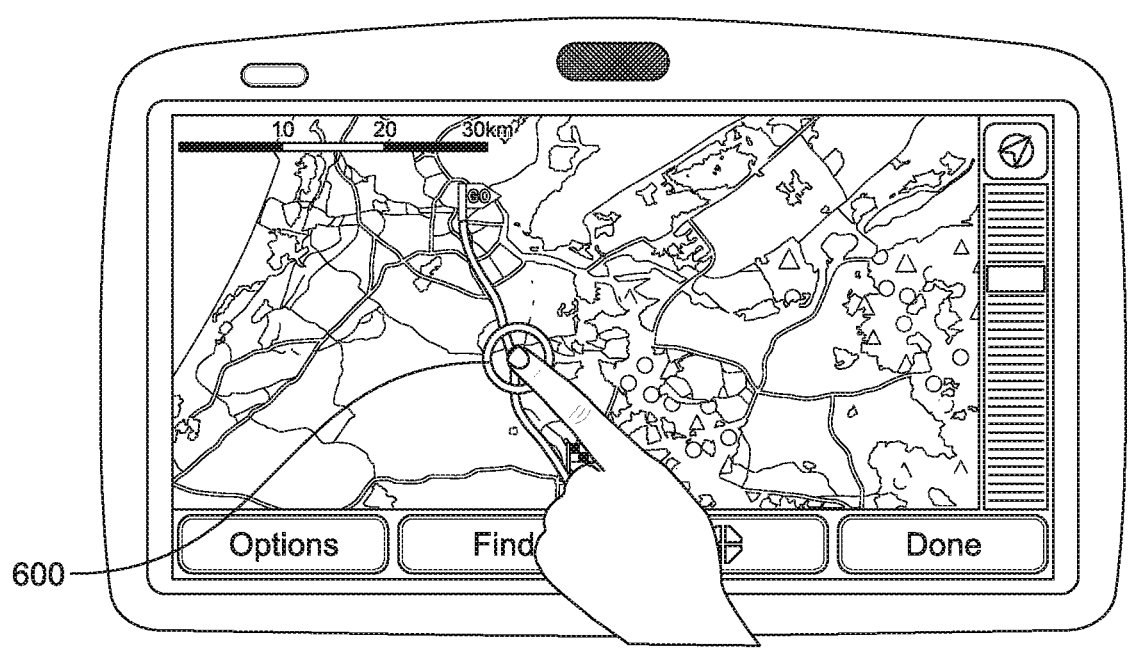
Figure 12:
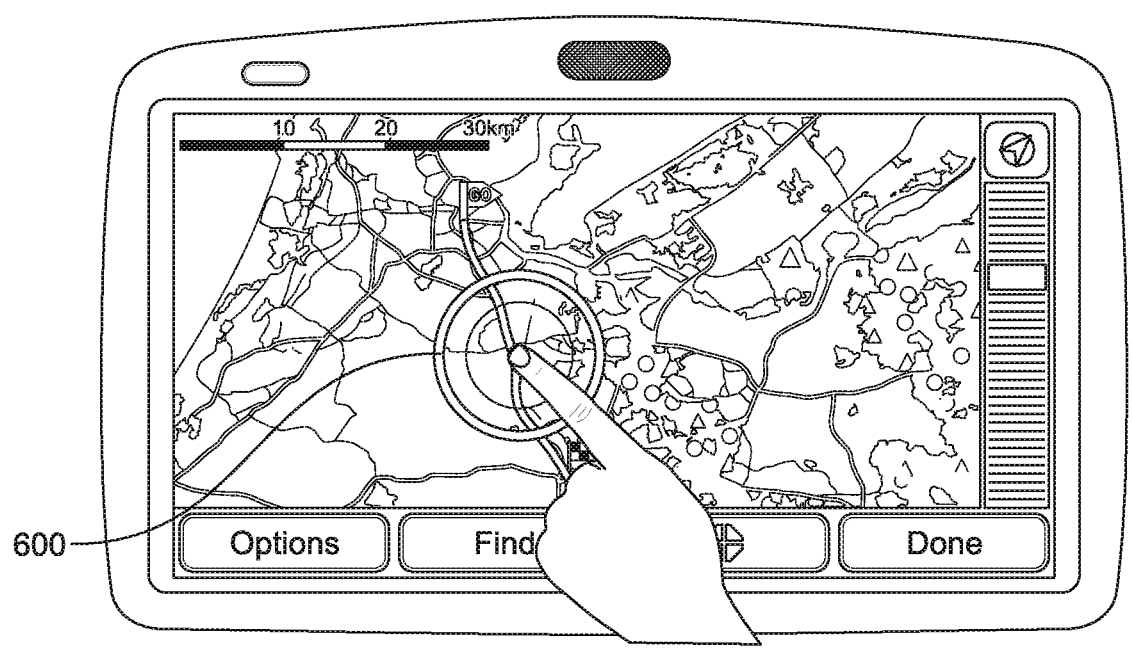

Another embodiment of the invention shown by reference to FIGS. 10, 11 and 12. In this embodiment, the PND is arranged to allow a user to indicate a selected portion of a displayed map using a touch based gesture. The map details are not shown in FIG. 10 for ease of illustration. FIG. 10 illustrates an embodiment in which the PND is arranged to receive a multi touch gesture based indication on the display, and infer a selected region therefrom. In the FIG. 10 embodiment the user touches a portion of the display using two fingers to provide pinch points 502 in a multi-touch gesture. As the user performs this gesture, the PDA determines a boundary 503 having a circumference passing through the pinch points. The boundary 503 encloses certain points denoted as dark stars 504. The boundary 503 excludes a further point 506, denoted by the light star lying outside the boundary 503. In this way, the boundary 503 defines a search area 505 of included points. The PND may thus determine which digital map data to be displayed corresponds to the region enclosed by the boundary 503. The boundary 503 and the area enclosed thereby defines a selected region in respect of which operations may be carried out. The boundary identifies a subset of the digital map data and/or navigation data associated with the map of interest to the user.

The multi touch gesture embodiment of FIG. 10 is only one example of the way in which a user may indicate a selected region of a displayed map. In FIG. 11 an alternative approach is used. Here the user presses their finger against the display screen. This causes a boundary 600 in the form of a circle to appear on the map centered about the point of contact. As the user keep their finger pressed on the display the circle increases in radius to the size shown in FIG. 12. The growth of the radius may be in response to the duration that the user keeps their finger pressed against the display, or the amount of pressure applied. The circle grows until such time as the user removes their finger from the display, indicating that the desired selected region bounded by the boundary 600 has been set. The selected region is highlighted on the display.

There are numerous other ways in which the user might define such a boundary defining a selected region and hence a set of included and excluded points in the displayed map. Rather than using a multi touch gesture, the user could draw a shape covering the desired selected region on the displayed map, or a line indicative of the boundary of the desired selected region. Such a line could be in the shape of a lasso. In other arrangements, the PND may present the user with a manipulable boundary to enable them to set the selected area. For example the user may be able to drag or resize the boundary etc.

In embodiments in which the PND presents the user with a boundary, the user may first specify that they wish to enter a boundary setting mode using an initial input, and then may be presented with the boundary e.g. to manipulate or whose size is to be set in a second operation. The initial input may be used to set the centre point of the boundary presented to the user.

The functionality of FIGS. 10-12 may be invoked at any point where a selected region is to be set. The user may first need to select or confirm that they wish to enter a selected region setting mode.

The embodiments of FIGS. 10 to 12 may be of use where the user wishes to specify a selected region of the map for any reason. Once the selected region has been set the PND may carry out any of a number of operations. The operations use digital map relating to the selected region. For example, in one arrangement, the selected region of the map may be a region which the user wishes to search for points of interest, or selected points of interest categories. The PND may carry out a search of the area for POIs in general, or specified categories thereof, and display the results on the map. The PND may display only POIs belonging only to certain recently used POI categories, or may employ heuristics to determine which POI categories to display, for example, based on time of day, destination chosen, whether the device is in a leisure or business mode etc. Searches may be carried out in respect of any of a range of items, including objects or persons. For example the user may wish to search for speed cameras, river crossings, address book entries etc, or for the presence of a contact in the region.

Another application of the embodiments of FIGS. 10-12 is in relation to setting an alert region. For example the selected area may be an area in which the user wishes to receive warnings regarding the presence of speed traps. The PND may provide such alerts when the user enters or leaves the selected region, or both.

The selected region may be a region which the user wishes to monitor in respect of a change. The change may be a change in relation to map features, e.g. speed cameras etc, or a given event, for example the entry or exit of a contact into the area. The PND may be arranged to provide an alert when the given change occurs.

The FIG. 10-12 embodiment may be used in a wide variety of applications where the user wishes to specify a selected region to the PND. This may be as part of a process to set up the PND or provide user preferences. For example, the user may specify the extent of a selected region in relation to which the PND is to carry out a function, such as providing warnings of speed traps, information regarding fuel prices etc.

The embodiment of FIGS. 10-12 may involve determining and using digital map data in the form of navigation data to perform an operation in respect of the selected region. Navigation data is digital map data which carries relevance for navigation in its broadest sense. Navigation data may be data relating to the road network. Navigation data may include data relating to the attributes of locations and/or roads in the selected region. For example this may include attributes of routes in the form of speed limits, scenicity, average wind direction/speed, closed hours, danger levels, level of windingness, surface quality, typical traffic levels etc, although these are only a few of the many possible types of attribute. The data may relate to attributes of general interest, or of interest to certain categories of user e.g. bikers. For example, bikers may be interested in how winding roads are, or the level of lorry traffic, road surface quality etc. In some cases, point or area based locations such as points of interest, contacts, favourites, local search results etc, may be considered to be navigation data. Such point or area based locations, such as national parks etc may influence the navigation data of routes passing through the area. For example, the presence of such points or areas may influence scenic level of the route. The apparatus may be arranged to perform operations of the type described above using such determined navigation data. By way of example, the apparatus may be arranged to perform a search for given types of navigation data relating to the selected region, e.g. a particular type of road attribute etc. The apparatus may be arranged to display a particular type of navigation data e.g. road attribute relating to roads in the selected region. Digital map data in the form of navigation data may be stored by the navigation apparatus e.g. in conjunction with other types of digital map data, or may be obtained by the apparatus e.g. in real time, or inferred from a person. For example the PND may be arranged to obtain location data relating to a person's friends from a social networking site.

In some further examples, the embodiment of FIGS. 10-12 may be used to set an area in respect of which certain navigation data, such as attribute data is to be searched for and displayed. Examples of such navigation data may include wind strength/direction, scenic level etc. Such information may be taken into account by a user to plan a route, and may influence whether the user wishes to avoid or go via the area. For example a caravan user may wish to avoid routes having high average wind speeds. A biker may be interested in the level of windingness of roads, the surface quality, typical levels of lorries etc.

Although the embodiments described in FIGS. 6 to 12 have been described by reference to a system including a touch display, in which the user directly indicates a region of the map by touching a part of the display, it will be appreciated that a pointer based system in which a user manipulates a cursor could also be used, or any other suitable technique which enables the user to indicate a selected region on the map display. Such implementations might be appropriate in relation to a mapping device provided by a computing resource rather than a PND, enabling the user to interact with the digital map and cause operations to occur in relation to the digital map data using a mouse, touch pad or other such interface. It is envisaged that a key or rotary based input could also be used in some situations.

The embodiment of FIGS. 11 to 12 is particularly applicable to non-touch based systems. For example, the user could specify the centre point of the boundary using a mouse click or operation of a user input device such as a rotary dial or a button once a cursor had been positioned in the appropriate part of the display. Rather than providing a boundary which grows over time or in response to a user action, the PND may present the user with a boundary illustrated on the display which the user may manipulate using a user input device such as a dial, mouse, touch pad etc. to indicate the selected region.

While the embodiments of FIGS. 6 to 9 have been described by reference to the use of a single touch gesture, it is envisaged that a multi-touch gesture could alternatively be used to provide a selected region in the form of a path to be calculated. Regardless or whether a touch based indication or other form of indication is used, the path may be selected using one or more indications. For example, rather than being formed by a single line drawn on to the displayed map as shown, the path may be selected using multiple indications which together provide the selected region or path, such as two lines drawn perpendicular to one another etc.

In accordance with any of the embodiments of the invention, and particularly that of FIGS. 10-12, the processor may be arranged to infer a selected area from one or more indications provided by a user. For example, the user may provide one or more indications of an approximate area from which the processor may infer a precise selected area. The user may generally indicate a region comprising both land and sea, e.g. a cluster of islands. The processor may then be arranged to infer a boundary of a precise selected region including only the land parts of the area. This may be achieved using a suitable underlying algorithm. In another arrangement, the processor may infer from an indication within a given region the entire region is to be selected. For example, an indication of a region comprised in a state may allow the processor to infer that the entire state is to be selected. The way in which the processor infers the selected region from an indication may be set by, for example, specifying a mode of operation of the device, or performing another setting operation. Such settings may be specified by a user, or preset. The processor may operate according to a default setting depending upon the type of operation the user is trying to perform e.g. map correction, search etc.

A further application of the embodiments shown in FIGS. 6 to 12 would be in relation to map corrections. The PND may include an option in the main menu of the type shown in FIG. 5a inviting the user to submit a map correction. When the user selects this virtual button they may select a region of the map to be displayed including an area in which they wish to make a correction. Conventionally a correction is specified using a menu-based system to enable the user to identify the nature of the correction, and the part of the map to which it is to be applied. However using the techniques of the present invention, the user may instead indicate the change to be made directly using a gesture on the display, or otherwise pointing to a part of the display using a touch based system or otherwise. For example the user may swipe over a one-way road to change the direction of the road, or may carry out a wiping gesture on a road that is blocked, draw in turn restrictions, roundabouts etc. The PND may be arranged to infer from the nature of the gesture the type of correction to be made.

Another application of the present invention, particularly relevant to the embodiment of FIGS. 10-12, would enable a user to specify an area to enable them to input digital map data. For example the user may specify a selected region in respect of which they wish to submit additional or modified navigation data. The navigation data may attribute information for a given road or location of the region. For example the user may wish to mark a route as being susceptible to high wind speeds, dangerous, fun etc. Such navigation data may then be useful to other users e.g. caravan users in the case of wind speed, when setting routes.

The embodiments of the invention thus provide an improved method whereby the user may interact with the underlying digital data of a map display by selecting a region of the map using an indication directly on the displayed map. This selection does not merely result in the manipulation of the map, but enables the system to determine digital map data corresponding to at least part of the selected region of the displayed map and carry out a navigation or mapping function using the data, or a function in relation to the specified region. In this way, the number of inputs required by the user to specify a desired operation may be significantly reduced. In the context of a navigation system this may reduce levels of driver distraction, but in the context of all types of mapping or navigation system the user is provided with a more intuitive interface and greater ease of use.

It will also be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst embodiments described in the foregoing detailed description refer to GPS, it should be noted that the navigation device may utilise any kind of position sensing technology as an alternative to (or indeed in addition to) GPS. For example the navigation device may utilise using other global navigation satellite systems such as the European Galileo system. Equally, it is not limited to satellite based but could readily function using ground based beacons or any other kind of system that enables the device to determine its geographic location.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A navigation or mapping apparatus comprising:
a display for displaying a digital map to a user;
a processor configured to access digital map data and cause a digital map to be displayed to the user using the display; and
a user interface operable by the user to enable the user to interact with the apparatus, wherein:
the user interface is arranged to allow the user to select a continuous region present in the digital map by providing one or more indications on the displayed digital map in use, the selected continuous region being a path indicative of a route the user wishes the apparatus to calculate; and
the processor is arranged to, when a selection of a continuous region present in the digital map is received from the user:
determine digital map data relating to the continuous region selected by the user, said determination of digital map data comprising determining a precise end point for use in the route calculation from an approximate end point indicated by the path selected by the user by matching the approximate end point to stored specified location data in the proximity of the approximate end point, the specified location data including general location data and/or user-specific location data identifying respective locations; and
calculate a route from a start point to the precise end point.

2. The apparatus of claim 1, wherein the processor is arranged to cause the selected continuous region to be illustrated on the map as it is indicated by the user.

3. The apparatus of claim 1, wherein the user interface is a touch sensitive display to enable the user to select the continuous region by touching the display and drawing a shape on the displayed map defining the selected region.

4. The apparatus of claim 1, wherein the processor is arranged to carry out a step of calculating a route using the determined digital map data.

5. The apparatus of claim 4, wherein:
the processor is arranged to determine a precise start point for use in the route calculation from at least one an approximate start point indicated by the path selected by the user by matching the at least one approximate start point to stored specified location data in the proximity of the at least one approximate start point; and
said route calculation comprises calculating a route from the precise start point to the precise end point using the determined digital map data.

6. The apparatus of claim 5, wherein the stored specified location data comprises one or more of favorite location data, address book entry data, point of interest location data, home location data, work location data, recently visited location data, business related location data and contact location data.

7. A portable navigation device (PND) comprising the apparatus of claim 1.

8. An integrated navigation system comprising the apparatus of claim 1.

9. A method of operating a navigation or mapping apparatus, comprising:
   accessing digital map data and using the accessed digital map data to display a digital map on a display of the apparatus;
   receiving from a user via a user interface of the apparatus a selection of a continuous region present in the displayed digital map, wherein the region is selected by the user providing one or more indications on the displayed digital map, the selected continuous region being a path indicative of a route the user wishes the apparatus to calculate;
   determining digital map data relating to the continuous region selected by the user, said determination of digital map data comprising determining a precise end point for use in the route calculation from an approximate end point indicated by the path selected by the user by matching the approximate end point to stored specified location data in the proximity of the approximate end point, the specified location data including preset general location data and/or user-specific location data identifying respective locations; and
   calculating a route from a start point to the precise end point using the determined digital map data.

10. The method of claim 9, wherein:
    said determination of digital map data further comprises determining a precise start point for use in the route calculation from at least one approximate start point indicated by the path selected by the user by matching the at least one approximate start point to stored specified location data in the proximity of the at least one approximate start point; and
    said route calculation comprises calculating a route from the precise start point to the precise end point using the determined digital map data.

11. The method of claim 9, comprising additionally inferring a route between the start point and the destination from the path selected by the user.

12. The method of claim 11, wherein the route is an itinerary, and the processor is arranged to additionally infer from the selected path one or more via points between the start point and destination, and an order of travel between the one or more via points.

13. The method of claim 9, wherein the stored specified location data comprises one or more of favorite location data, address book entry data, point of interest location data, home location data, work location data, recently visited location data, business related location data and contact location data.

14. A non-transitory computer program product comprising computer readable instructions executable to perform a method according to claim 9.

* * * * *